US012248722B2

(12) United States Patent
Shih

(10) Patent No.: US 12,248,722 B2
(45) Date of Patent: Mar. 11, 2025

(54) IMAGE CORRECTION SYSTEM AND METHOD THEREFOR

(71) Applicant: Shan-Le Shih, New Taipei (TW)

(72) Inventor: Shan-Le Shih, New Taipei (TW)

( * ) Notice: Subject to any disclaimer, the term of this patent is extended or adjusted under 35 U.S.C. 154(b) by 0 days.

(21) Appl. No.: 18/267,440

(22) PCT Filed: Aug. 6, 2021

(86) PCT No.: PCT/CN2021/111249
§ 371 (c)(1),
(2) Date: Jun. 14, 2023

(87) PCT Pub. No.: WO2023/010546
PCT Pub. Date: Feb. 9, 2023

(65) Prior Publication Data

US 2024/0118850 A1 Apr. 11, 2024

(51) Int. Cl.
*G06T 3/40* (2024.01)
*G06F 3/14* (2006.01)
*H04N 23/695* (2023.01)

(52) U.S. Cl.
CPC .................. *G06F 3/14* (2013.01); *G06T 3/40* (2013.01); *H04N 23/695* (2023.01)

(58) Field of Classification Search
None
See application file for complete search history.

(56) References Cited

U.S. PATENT DOCUMENTS

2020/0106918 A1* 4/2020 Nakamura ........... H04N 1/3873
2021/0168243 A1* 6/2021 Fujii .................. H04N 1/00551

OTHER PUBLICATIONS

PhotoShip notes—retrieved from https://blog.xuite.net/mikistyle/myself/17317037 (May 25, 2008)steps 1-6.
Book—Digital Image Processing, Rafael C. Gonzalez and Richard E. Woods, 4 edition, 2018 p. 77,105.
Official action issued by Taiwan Intellectual and Patent Office on Feb. 23, 2022.

* cited by examiner

*Primary Examiner* — Brian M Butcher
(74) *Attorney, Agent, or Firm* — Chun-Ming Shih; LANWAY IPR SERVICES

(57) ABSTRACT

The present invention provides an image correction system configured on an electronic device, which outputs an image to a display screen and stores at least one image regression application unit; the at least one image regression application unit at least comprises a tilt correction element and an aspect correction element and is used to extract an original image captured image and generated tilt angle information from one or more image information carriers, to output a new pixel position based on tilt angle information of a gravity angle sensor, and to perform image aspect ratio correction, so as to obtain a result of regressing a horizontal tilt angle of a minimum complete image when an image capture device is tilted and maintaining the aspect ratio, thereby enabling an image record to be regressed to horizontal, non-truncated, and consistent with the aspect ratio of an original image.

9 Claims, 24 Drawing Sheets

IMAGE CORRECTION SYSTEM AND METHOD THEREFOR

FIELD OF THE INVENTION

The present invention relates to an image correction system and a method therefor, which is an image correction system and the method capable of returning to an image record that is horizontal, non-truncated, and has the same aspect ratio as the original image captured image.

BACKGROUND OF THE INVENTION

The APP menu displays on a mobile phone, it can only be adjusted according to the horizontal (the wide side would be horizontal, narrow side would be vertical) or vertical (the narrow side would be horizontal, wide side would be vertical) landscape orientation of the mobile phone, and the gravity sensing element is automatically adjusted. The visual image is displayed on the screen in a "fixed interval" every 90 degrees, and cannot display angle by will; it also cannot adjust the inclination difference between the lens and the display screen at a small angle (less than 90 degrees). In FIG. 1A, the body angle of the person being photographed and the body angle of the person on the screen are both upward in the real image of the person being photographed 1 and the image on the screen of shooting equipment 11, and there will be no angular deviation or less than 90-degree rotation, even if using three-axis stabilizer.

The angle of the rotated image can be controlled through some technologies, and then the original image captured image is rotated back to any angle. If the size of the image is not changed, at least two corners of the image frame will run outside the image frame, resulting in the defect of truncated corners and make the image incomplete. As shown in FIG. 1B, when the captured image is sent to another receiver display device 12, even the receiver display device 12 has the function to rotate the image back to the horizontal. As shown in FIG. 1B, where part of the original captured dotted frame line 121 is the image boundary obtained by shooting, if the center is rotated, the four corners will be truncated.

In addition, there is another problem, as shown in FIG. 2A, when the camera lens of the original image captured image taken by the person being photographed 2 using shooting equipment 21 is not in a horizontal position, and when the receiving end or after watching the video, as shown in FIG. 2B. It shows that the picture displayed on the receiver display device 22 will confuse the viewer about the relationship between the real scene being captured and the inclination of the camera lens, and it is impossible to know whether the left side is higher or the right side is higher;

From the perspective of conventional patents, whether it is the left and right mirroring technology of CN107968912, the image inversion technology of JP3111261, and the electronic handheld mirror patent of JP 2003-219224 for manually flipping the lens module, neither takes into account the adjustment when the lens is tilted horizontally. The patent for left and right mirroring of CN107968912 also only includes the coordinate conversion of the intrinsic parameters (Intrinsic) in the camera, but when the user uses the camera lens in the natural coordinate system, it will be more or less due to the convenience of holding the lens, the grip is good or bad. Whether the performance level, the camera lens will rotate in the direction of the shooting axis (extrinsic parameters outside the camera will change), and the receiving side will not adapt to the horizontal skew of the image (as mentioned above);

However, the mobile phones with camera lens are mostly equipped with gravity sensors (or "gravity line angle measuring components"), and some of them have anti-shake (Anti-Shake) dynamic correction technology, but they still cannot achieve the return level of any inclination of the image or keep the aspect ratio.

As mentioned above, there are currently three-axis stabilizers on the market. As shown in FIG. 3, this type of three-axis stabilizer 3 can be adjusted in time to keep the images in a horizontal state. Therefore, no matter how the user shakes or moves, the stability of the image can be maintained. However, if this type of equipment is to be accurate and fast enough, the equipment must be heavy and have many components. It is burdensome and inconvenient for users to carry out.

Therefore, in order to continuously calibrate and regress the horizontal image according to the continuously changing arbitrary inclination of the image, and to return to the image record that is non-truncated and has the same aspect ratio as the original image captured image. The present invention provides an image regression application unit. The system at least includes a tilt correction element and an aspect correction element, wherein the image regression application unit is used to obtain an original image captured image and a tilt angle information from one or more image information carriers, and then output a new image according to the tilt angle information, new pixel position, and then perform correction image aspect ratio to obtain the result of the minimum complete image horizontal inclination regression when the camera is tilted and maintain the aspect ratio. Therefore, it can be returned to the horizontal, non-truncated, and the original image captured image aspect ratio a consistent image record, so the present invention should be an optimal solution.

SUMMARY OF THE INVENTION

An image correction system, which is provides on electronic device, the electronic device has at least one processor and at least one computer-readable recording medium, and the electronic device is capable of outputting an image to a display screen, and the computer-readable recording medium stores a or a plurality of image information carriers, wherein the image correction system and method therefor includes:

at least one image regression application unit, which is stored in the computer-readable recording medium, and the image regression application unit includes at least:

a tilt correction element, which is able to obtain an original image captured image and a tilt angle information (θ) from one or more image information carriers, and scan each frame of the image signal of the original image captured image to obtain a total number of pixels in the original horizontal direction (w), a total number of pixels in the original vertical direction (h), a horizontal coordinate of any original pixel (x), and a vertical coordinate of any original pixel (y), and then output the total number of pixels in the first horizontal direction (w') and a total number of pixels in the first vertical direction (h') around the original image captured image according to the total number of pixels in the original horizontal direction (w) and the total number of pixels in the original vertical direction (h) and generates a surrounding frame, wherein the surrounding frame is in contact with the four vertices of the image boundary of the original image captured image, and outputs a first pixel horizontal coordinate (x') and a first pixel vertical coordinate (y'), so that the original image captured image can generate a new pixel position according to a plurality of first pixel horizontal coordinate (x') and a plurality of first pixel vertical coordinate (y'), the original image captured image correction can be returned to the horizontal state without tilt; and an aspect correction element, which are connected to the tilt correction element, can obtain a total number of pixels in the second horizontal direction (w") and a total number of pixels in the second vertical direction (h") according to an original image equal aspect ratio (h/w), and output a second pixel horizontal coordinate (x") according to the total number of pixels in the second horizontal direction (w"), the total number of pixels in the first horizontal direction (w') and the first pixel horizontal coordinate (x'), and output a second pixel vertical coordinate (y") according to the first pixel vertical coordinate (y'), so that the image output on the display screen for correction can be consistent with the image aspect ratio of the original image captured image.

More specifically, the surrounding frame is a circumscribed rectangular frame, wherein the circumscribed rectangular frame is formed along four vertices of the image boundary of the original image captured image.

More specifically, the surrounding frame is a circular frame, wherein the circular frame is formed with the center of the original image captured image as the center of the circle, and the four vertices of the image boundary of the original image captured image are in contact on the round frame.

More specifically, the electronic device can be provided with or connected to a camera lens electrically connected to the processor and a gravity angle sensor that is electrically connected to the processor, and can generate the original image captured image through the camera lens, detect the tilt angle information (θ) through the gravity angle sensor, and read and write the computer-readable recording medium.

More specifically, the image information carrier is an original image captured image containing the tilt angle information (θ, or gravity line angle information) for each frame of image.

More specifically, the original image captured image containing the tilt angle information (θ) of each frame of image is in an exchangeable image file format (e.g., the Japanese standard is Exchangeable image file format, Exif).

More specifically, the image regression application unit has a control switching module for controlling the image displayed on the display screen to be the original image captured image after correction or the original image captured image without correction image.

More specifically, the display screen can be installed on the electronic device or connected to the electronic device through a connector or wireless connection.

An image correction method, wherein the steps is:

an image regression application unit retrieves an original image captured image and a tilt angle information (θ) from one or more image information carriers, and scans each frame of image signals of the original image captured image to obtain a total number of pixels in the original horizontal direction (w), a total number of pixels in the original vertical direction (h), a horizontal coordinate of any original pixel (x), and a vertical coordinate of any original pixel (y);

the image regression application unit outputs a total number of pixels in the first horizontal direction (w') and a total number of pixels in the first vertical direction (h') around the original image captured image according to the total number of pixels in the original horizontal direction (w) and the total number of pixels in the original vertical direction (h) and generating a surrounding frame, the surrounding frame is in contact with the four vertices of the image boundary of the original image captured image;

the image regression application unit outputs a first pixel horizontal coordinate (x') and a first pixel vertical coordinate (y') in a not tilted state according to the tilt angle information (θ), so that the original image captured image can be based on a plurality of a first pixel horizontal coordinate (x') and a plurality of first pixel vertical coordinate (y') generate a new pixel position, so as to correct the original image captured image back to a horizontal state without tilt according to the new pixel position; and the image regression application unit obtains a total number of pixels in the second horizontal direction (w") and a total number of pixels in the second vertical direction (h") according to an original image equal aspect ratio (h/w), and output a second pixel horizontal coordinate (x") according to the total number of pixels in the second horizontal direction (w"), the total number of pixels in the first horizontal direction (w') and the first pixel horizontal coordinate (x'), and then outputs a second pixel vertical coordinate (y") according to the first pixel vertical coordinate (y') for correcting the image output to the display screen to be consistent with the image aspect ratio of the original image captured image.

DETAILED DESCRIPTION OF THE INVENTION

Figure 4A:
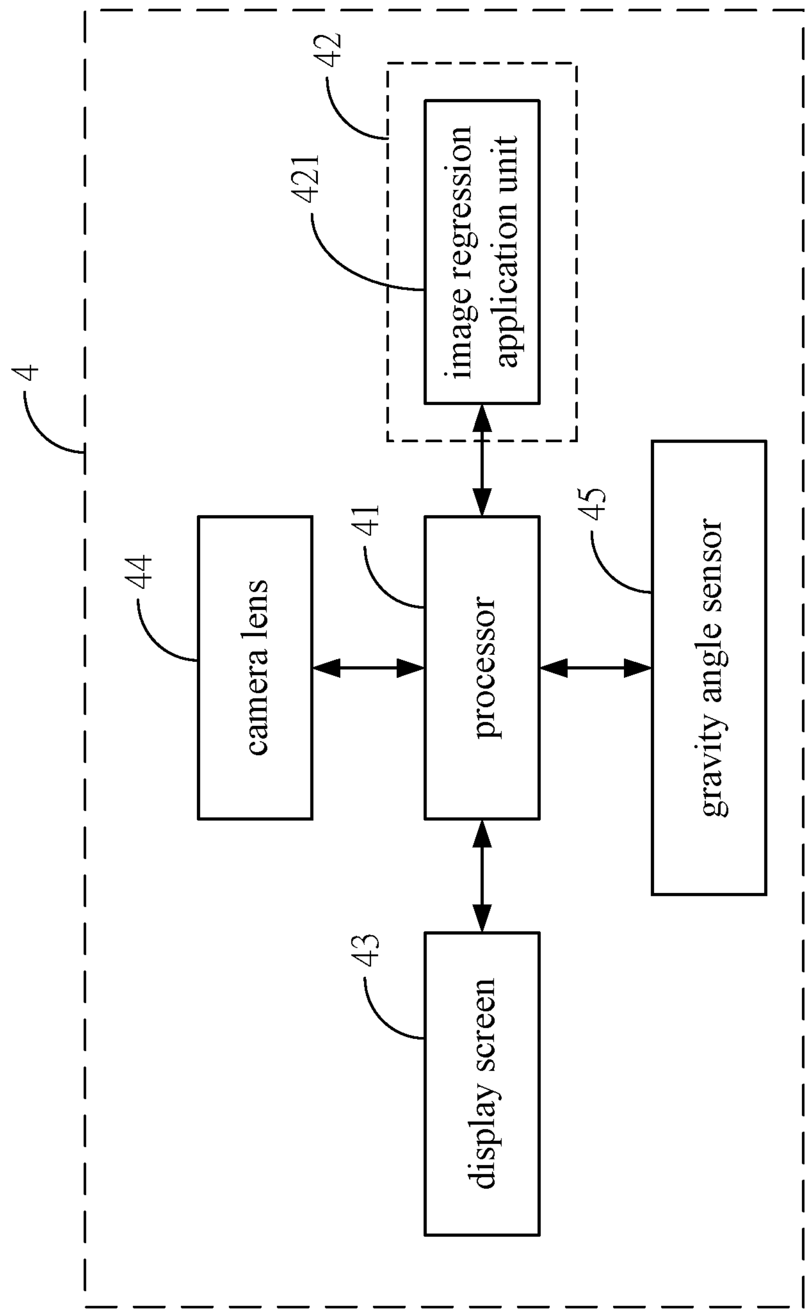
FIG. 4A is a schematic diagram of the system structure of the image correction system and the method therefor of the present invention.
Figure 4B:
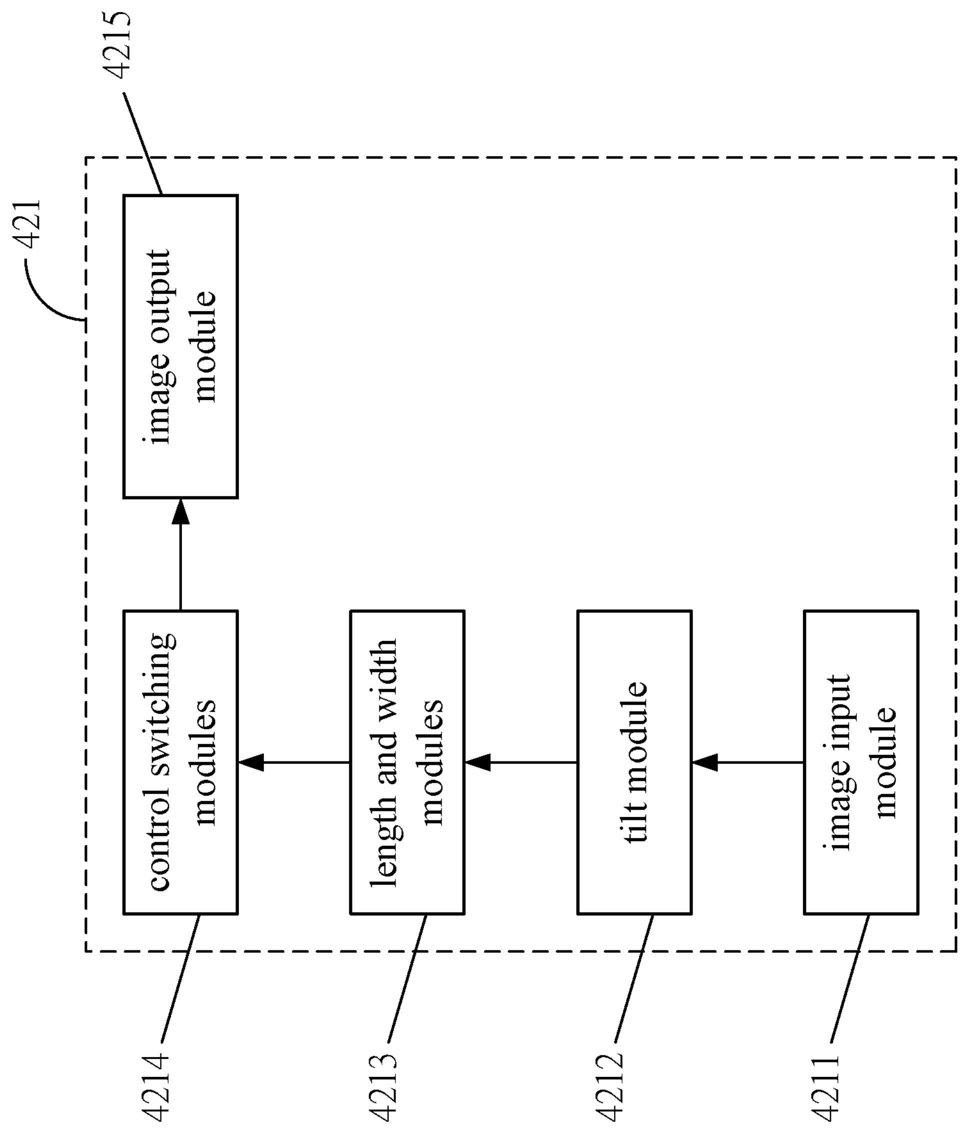
FIG. 4B is a schematic diagram of the structure of the image regression application unit of the image correction system and method of the present invention.
Figure 5:
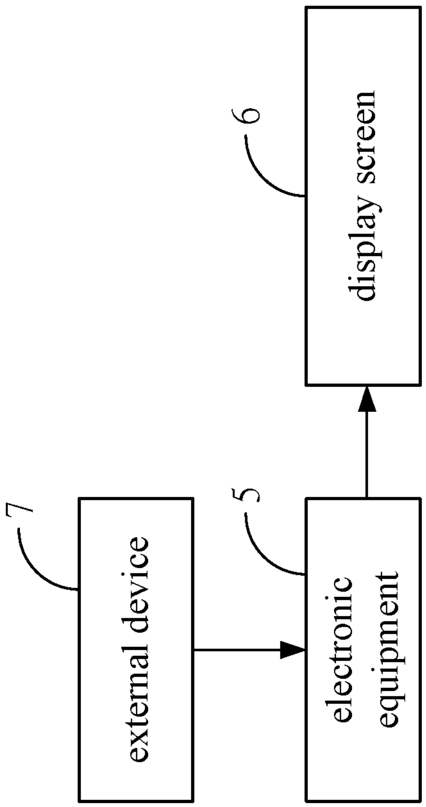
FIG. 5 is a schematic diagram of another system structure of the image correction system and the method therefor of the present invention.

Please refer to FIGS. 4A and 4B, which are a schematic diagram of the overall architecture of the image correction system and the method therefor of the present invention and a schematic diagram of the architecture of the image regression application unit of the image correction system and the method therefor of the present invention. As shown in the figures, the image correction system is set in an electronic device 4 (electronic device 4 can be handheld smart devices, tablet computers, cameras, video recorders or notebook computers and other equipment with lenses), the electronic device 4 has at least one processor 41 and at least one computer-readable recording medium 42, and the electronic device 4 can output image to a display screen 43. The display screen 43 can be set on the electronic device 4 (or as shown in FIG. 5, the display screen 6 is connected to the electronic device 5 through a connector or wireless connection for display);

The computer-readable recording medium 42 stores one or more image information carriers (dynamic images or static images) and at least one image regression application unit 421, and the structure and information processing of the image regression application unit 421 are as shown in FIG. 4B includes:

(1) a tilt correction element 4212, wherein the image information carrier can be retrieved from the computer-readable recording medium 42 through an image input element 4211 (or the image information carrier can be retrieved from an external device through the image input element 4211), and obtain an original image captured image and a tilt angle information (θ refers to the inclination angle of the camera lens, which is generally obtained by sensing through the gravity angle sensor, so it can also be called gravity line angle information θ) from one or more image information carriers, and scan each frame of the image signal of the original image captured image to obtain a total number of pixels in the original horizontal direction (w), a total number of pixels in the original vertical direction (h), a horizontal coordinate of any original pixel (x), and a vertical coordinate of any original pixel (y), and then output the total number of pixels in the first horizontal direction (w') and a total number of pixels in the first vertical direction (h') around the original image captured image according to the total number of pixels in the original horizontal direction (w) and the total number of pixels in the original vertical direction (h) and generates a surrounding frame, wherein the surrounding frame is in contact with the four vertices of the image boundary of the original image captured image, and outputs a first pixel horizontal coordinate (x') and a first pixel vertical coordinate (y'), so that the original image captured image can generate a new pixel position according to a plurality of first pixel horizontal coordinate (x') and a plurality of first pixel vertical coordinate (y'), so as to generate the new pixel position according to the new pixel position, the original image captured image correction can be returned to the horizontal state without tilt; and (2) An aspect correction element 4213, which are connected to the tilt correction element 4212, can obtain a total number of pixels in the second horizontal direction (w") and a total number of pixels in the second vertical direction (h") according to an original image equal aspect ratio (h/w), and output a second pixel horizontal coordinate (x") according to the total number of pixels in the second horizontal direction (w"), the total number of pixels in the first horizontal direction (w') and the first pixel horizontal coordinate (x'), and output a second pixel vertical coordinate (y") according to the first pixel vertical coordinate (y'), so that the image output on the display screen 43 for correction can be consistent with the image aspect ratio of the original image captured image (That is: h"/w"=h/w the same below.)

Figure 6:
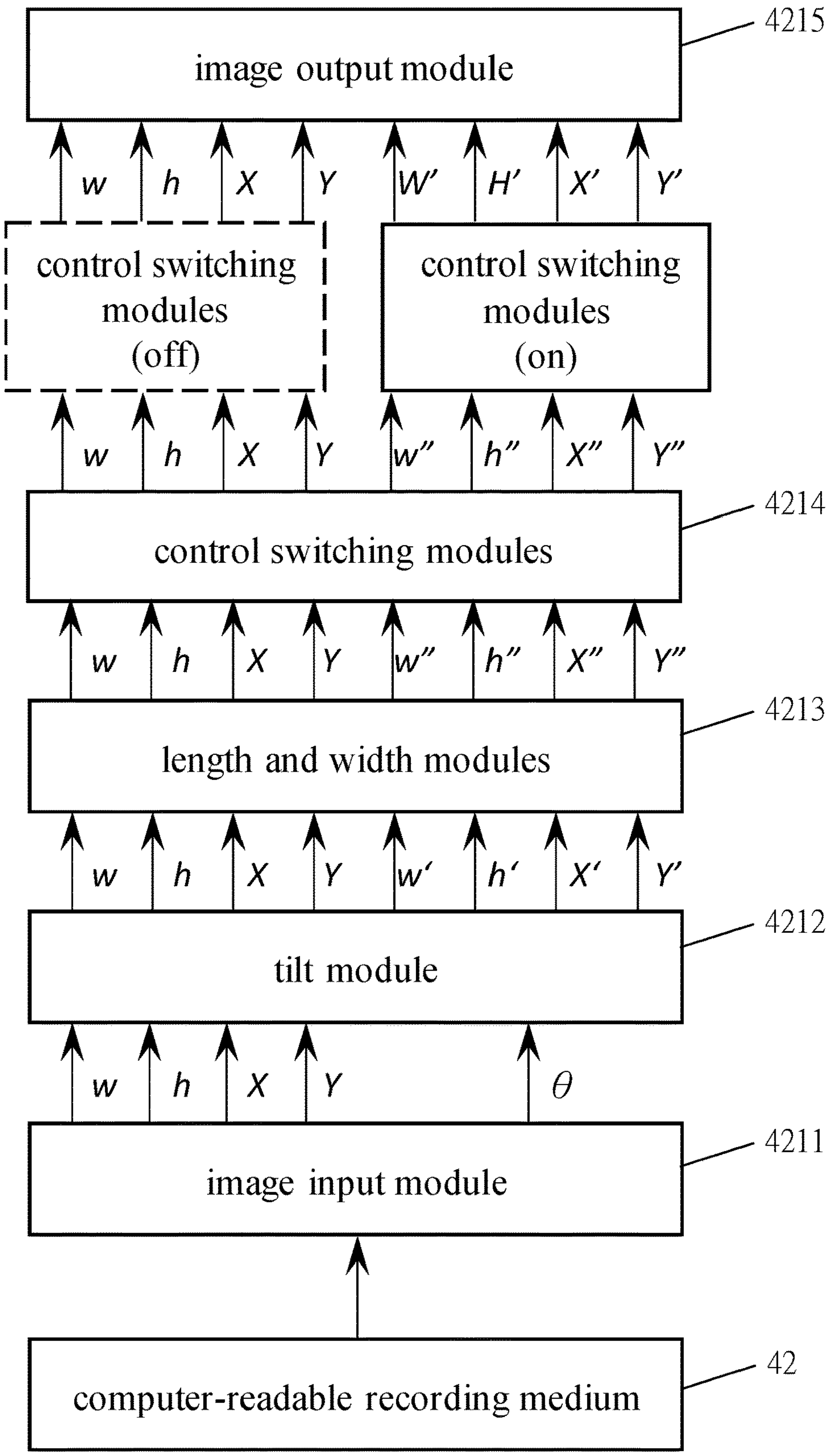
FIG. 6 is a schematic diagram of the information processing of the image correction system and the method therefor of the present invention.

(3) A control switching element 4214 is connected to the aspect correction element 4213, and the image used to control the display on the display screen 43 is the original image captured image after correction or the original image captured image without correction. The aspect correction element 4213 can transmit the total number of pixels in the total number of pixels in the original horizontal direction (w), the total number of pixels in the original vertical direction (h), the horizontal coordinate of any original pixel (x), the vertical coordinate of any original pixel (y), and the total number of pixels in the second horizontal direction (w"), the total number of pixels in the second vertical direction (h"), any second pixel horizontal coordinate (x"), and any second pixel vertical coordinate (y") to the control switching element 4214. As shown in FIG. 6, if the control switching element 4214 are turned off, the total number of pixels in the original horizontal direction (w), the total number of pixels in the original vertical direction (h), the horizontal coordinate (x) of any original pixel, and the vertical coordinate (y) of any original pixel are transmitted through the image output element 4215 outputs the not calibrated original image captured image on the display screen 43; on the contrary, if the control switching element 4214 are turned on, the total number of pixels in the second horizontal direction (w") and the total number of pixels in the second vertical direction (h"), any second pixel horizontal coordinate (x"), and any second pixel vertical coordinate (y") through the image output element 4215 to output the original image captured image on the display screen 43 after correction.

In addition, the tilt correction elements 4212, aspect correction element 4213 and control switching element 4214 in this case can not only be controlled by software with a software interface, but also can be set up or externally connected to a physical control panel through the electronic device 4, and different entities on the panel can be controlled through the physical control panel. Buttons or related components are used to enable or disable the operation of the tilt correction elements 4212, aspect correction element 4213 and control switching element 4214.

As shown in FIG. 4A, the electronic device 4 can further be provided with or connected to a camera lens 44 electrically connected to the processor 41 and a gravity angle sensor 45 electrically connected to the processor 41, and can generate the original image captured image through the camera lens 44 and the tilt angle information (θ) is detected through the gravity angle sensor 45; in addition, as shown in FIG. 5, the electronic device 5 itself does not need to be provided with a camera lens and gravity angle sensor, and can be connected through a connector or wireless The connection method is used to connect and obtain the image information carrier provided by the external device 7.

The image information carrier can include the original image captured image and the tilt angle information (θ), where the source of the image information carrier is:

(1) If the analysis device itself has a camera lens and a gravity angle sensor, the original image captured image can be generated by the camera lens, and the tilt angle information (θ) can be detected by the gravity angle sensor;

(2) If the analysis device itself has a camera lens and a gravity angle sensor, an external device can transmit an original image captured image containing the tilt angle information (θ) in each frame of the image. This type of original image captured image is in an exchangeable image file format (For example, Japanese standard: Exchangeable image file format, Exif);

(3) If the analysis device itself does not have a camera lens or/and a gravity angle sensor, an external device can transmit an original image captured image containing the tilt angle information (θ) in each frame of the image. This type of original image captured image is an exchangeable image. File format (ex. Japanese standard: Exchangeable image file format, Exif).

Figure 7A:
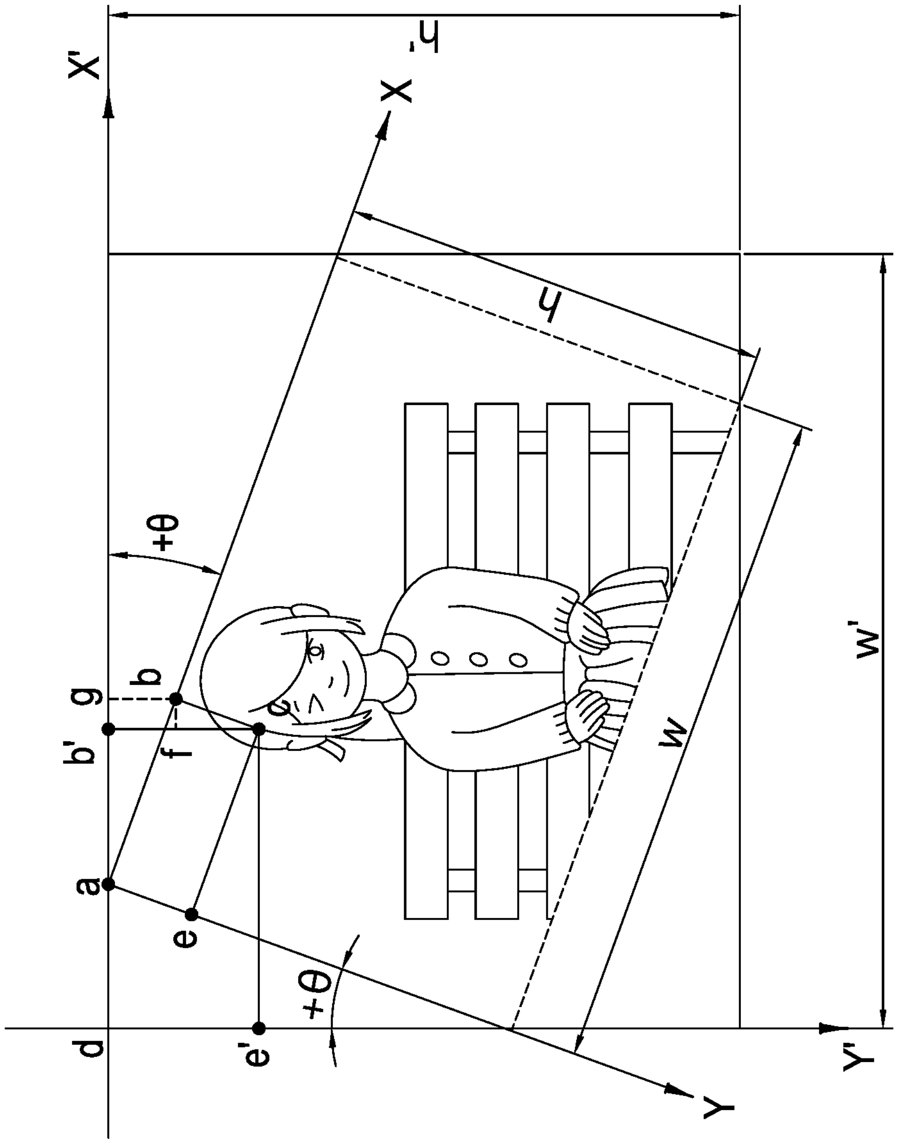
FIG. 7A is a schematic diagram of the calculation and analysis of the positive tilt angle of the new coordinate axis of the image correction system and the method therefor the present invention.

The surrounding frame in this case is a circumscribed rectangular frame, that is, the circumscribed new coordinate axis (obtaining the optimum image), wherein the circumscribed rectangular frame is formed along the four vertices of the image boundary of the original image captured image. The FIG. 7A and FIG. 7B further illustrates that if the width of the original image is w pixels and the height is h pixels, then when the "external new coordinate axis image" still uses the upper left corner as the image processing origin, there will be no truncation, but it will be generated because the inclination is positive (clockwise rotation) and negative (counterclockwise rotation) will generate 2 sets of new coordinates, and the operation of tilt correction element 4212 is described as follows (this specification uses the upper left corner, which is currently mostly used in image processing, as the origin, and the formula is deduced. Generally, those skilled in the art can follow the steps below to convert the formula with the lower left corner, upper right corner and lower right corner as the origin):

As shown in FIG. 7A, when the original shooting lens is tilted clockwise, that is, when the tilt angle information (θ) is greater than or equal to 0 and less than 90 degrees, the total number of pixels in the original horizontal direction (w), the total number of pixels in the original vertical direction (h), the horizontal coordinate of any original pixel (x), and the vertical coordinate of any original pixel (y), and the calculation method is as follows:

(1) The calculation method of the total number of pixels in the total number of pixels in the first horizontal direction (w') is as follows:

$$w'=w\cdot\cos\theta+h\cdot|\sin\theta|$$

(2) The calculation method of the total number of pixels in the first vertical direction (h') is as follows:

$$h'=w\cdot|\sin\theta|+h\cdot\cos\theta$$

(3) The operation method of the first pixel horizontal coordinate (x') is as follows:

$$\begin{aligned} X' &= \overline{e'c} = \overline{da} + \overline{ab'} = \overline{da} + \overline{ag} - \overline{b'g} = \overline{da} + \overline{ab}\cdot\cos\theta - \overline{fb} \\ &= h\cdot\sin\theta + \overline{ec}\cdot\cos\theta - \overline{cb}\cdot\sin\theta \\ &= h\cdot\sin\theta + X\cdot\cos\theta - Y\cdot\sin\theta \\ &= X\cdot\cos\theta - Y\cdot\sin\theta + h\cdot\sin\theta \end{aligned}$$

(4) The first pixel vertical coordinate (y') of the first pixel is calculated as follows:

$$\begin{aligned} Y' &= \overline{cb'} = \overline{bg} + \overline{cf} = \overline{ab}\cdot\sin\theta + \overline{cb}\cdot\cos\theta \\ &= \overline{ec}\cdot\sin\theta + \overline{cb}\cdot\cos\theta \\ &= X\cdot\sin\theta + Y\cdot\cos\theta \end{aligned}$$

Figure 7B:
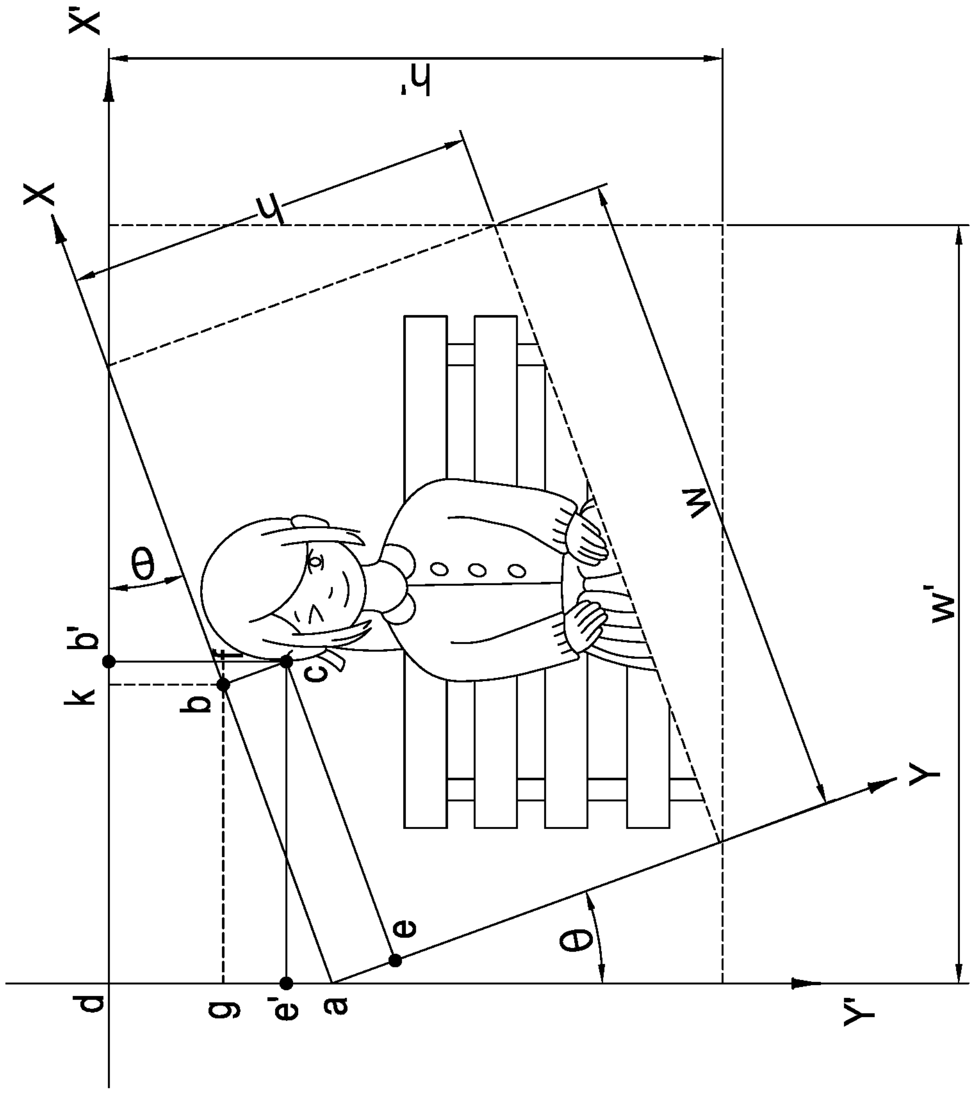
FIG. 7B is a schematic diagram of the calculation and analysis of the negative tilt angle of the new coordinate axis of the image correction system and the method therefor the present invention.

As shown in FIG. 7B, when the original shooting lens is tilted at a negative angle counterclockwise, that is, when the tilt angle information (θ) is less than 0 and greater than minus 90 degrees, the original image captured image first obtains the total number of pixels in the original horizontal direction (w), the total number of pixels in the original vertical direction (h), the horizontal coordinate of any original pixel (x), and the vertical coordinate of any original pixel (y), and the calculation method is as follows:

(1) The calculation method of the total number of pixels in the first horizontal direction (w') is as follows:

$$w' = w \cdot \cos\theta + h \cdot |\sin\theta|$$

(2) The calculation method of the total number of pixels in the first vertical direction (h') is as follows:

$$h' = w \cdot |\sin\theta| + h \cdot \cos\theta$$

(3) The first pixel horizontal coordinate (x') of the first pixel is calculated as follows:

$$X' = \overline{e'c} = \overline{db'} = \overline{dk} + \overline{kb'} = \overline{gb} + \overline{bf} = \overline{ab} \cdot \cos\theta + \overline{cb} \cdot |\sin\theta| = \overline{ec} \cdot \cos\theta - \overline{cb} \cdot \sin\theta = X \cdot \cos\theta - Y \cdot \sin\theta$$

(4) The first pixel vertical coordinate (y') of the first pixel is calculated as follows:

$$Y' = \overline{cb'} = \overline{fb'} + \overline{cf} = \overline{gd} + \overline{cf} = \overline{ad} - \overline{ag} + \overline{cf} = w \cdot |\sin\theta| - \overline{ab} \cdot |\sin\theta| + \overline{cb} \cdot \cos\theta = w \cdot |\sin\theta| - \overline{ec} \cdot |\sin\theta| + \overline{cb} \cdot \cos\theta = w \cdot |\sin\theta| - X \cdot |\sin\theta| + Y \cdot \cos\theta = X \cdot \sin\theta + Y \cdot \cos\theta - w \cdot \sin\theta$$

Figure 8A:
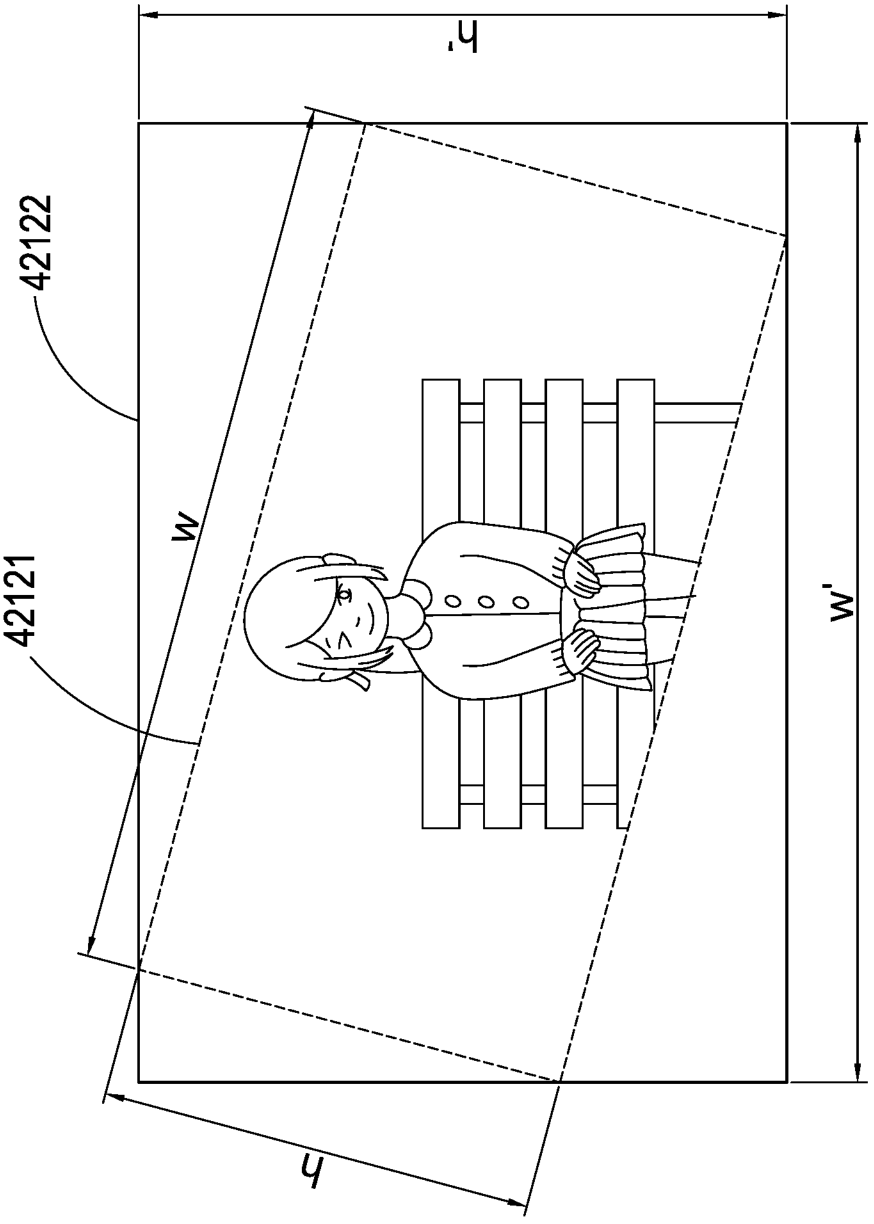
FIG. 8A is a schematic diagram of the calculation and analysis of the different angles of the new coordinate axis of the image correction system and the method therefor the present invention.
Figure 8B:
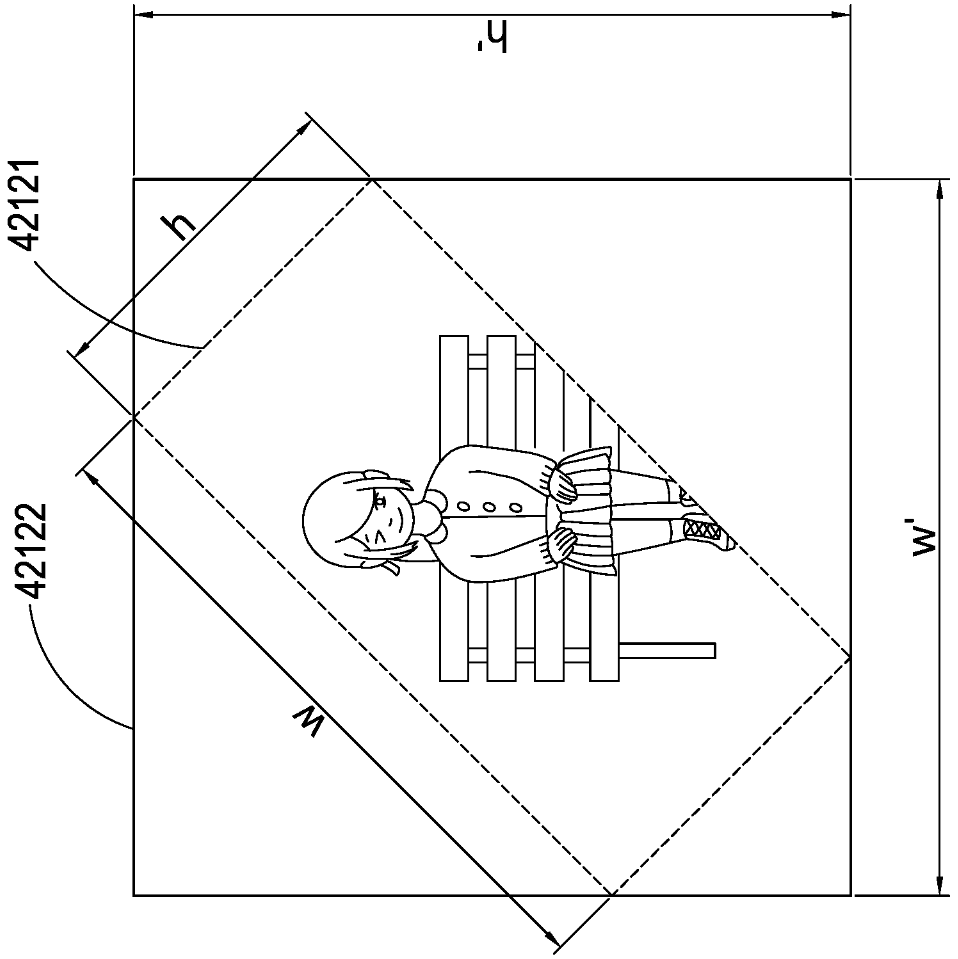
FIG. 8B is a schematic diagram of the calculation and analysis of the different angles of the new coordinate axis of the image correction system and the method therefor the present invention.

The following different implementation styles are presented from different angles:

As shown in FIG. 8A, it represents that the original shooting lens is inclined clockwise (positive 15 degrees), in which the frame line of image boundary 42121 represents the image boundary of the original image captured image, and the frame line of frame line 42122 represents the circumscribed rectangular frame;

As shown in FIG. 8B, it means that the original shooting lens is tilted at a negative angle (minus 45 degrees) counterclockwise, in which the frame line of image boundary 42121 represents the image boundary of the original image captured image, and the frame line of frame line 42122 represents the circumscribed rectangle.

Figure 9:
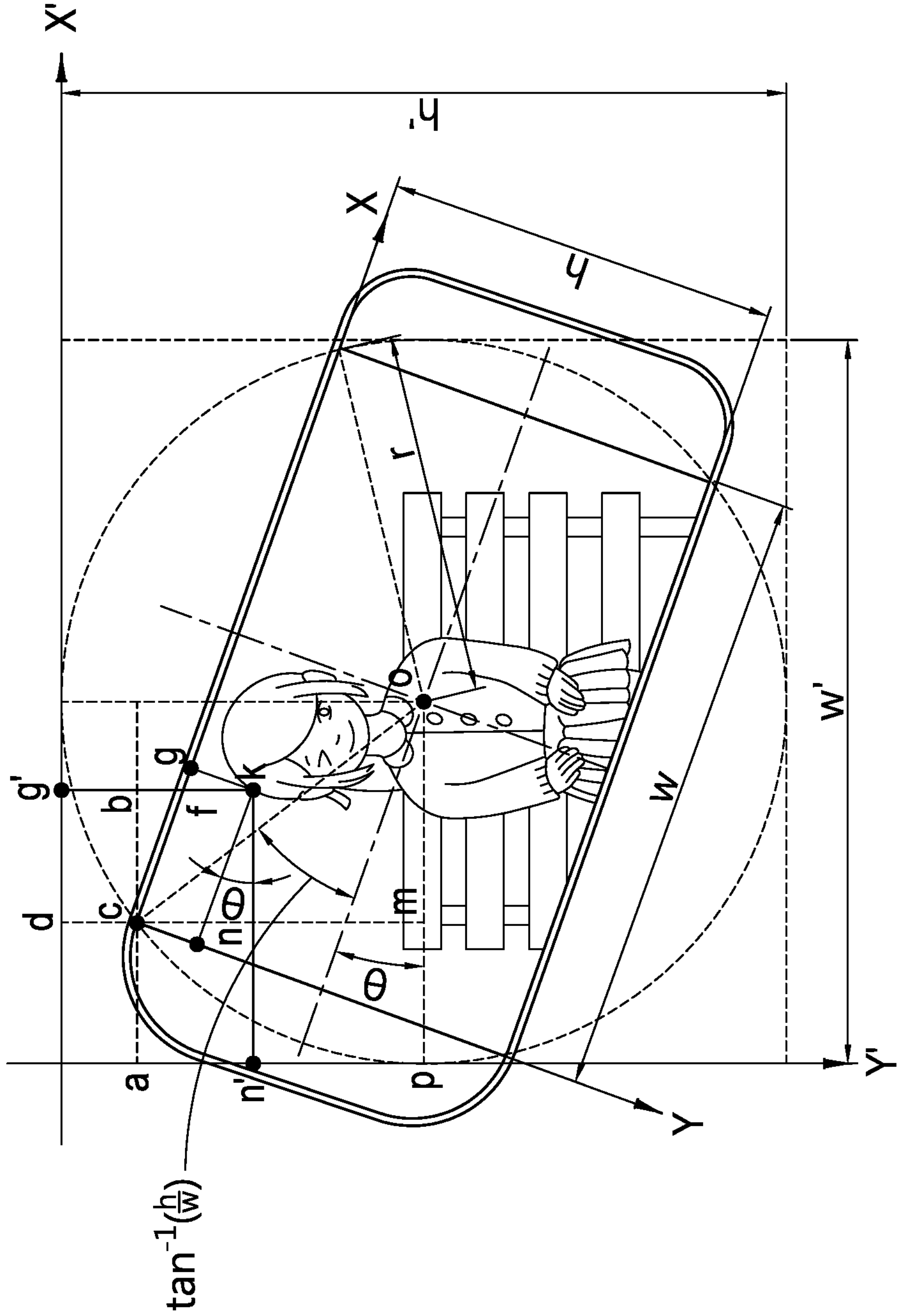
FIG. 9 is a schematic diagram of the operation analysis of the center of rotate image of the image correction system and the method therefor of the present invention.

The surrounding frame in this case is a circular frame, that is, the center of the original image is the center of the circle, the four vertices of the image are circumscribed (the center rotates the image), and the four vertices of the image boundary of the original image captured image are in contact with the circular frame. Taking the center of the original image as the center of the circle, the four vertices of the image are circumscribed (the center rotates the image). Taking the image of the FIG. 9 image as an example, if the width of the original image is still w pixels and the height is still h pixels, then The horizontal upper right tangent and the vertical downward left tangent of "the circumcircle of the four vertices of the image" are the new coordinate axes. When changing to new coordinates, since they are all in the positive quadrant, there will be no truncation, and only one new set of coordinates will be generated. The formula derivation is disclosed. Generally, those skilled in the art can follow the following steps to convert the formula with the lower left corner, upper right corner and lower right corner as the origin:

(1) The calculation method of the total number of pixels in the first horizontal direction (w') is as follows:

$$w' = 2r = \sqrt[2]{w^2 + h^2}$$

(2) The calculation method of the total number of pixels in the first vertical direction (h') is as follows:

$$h' = 2r = \sqrt[2]{w^2 + h^2}$$

(3) The operation method of the first pixel horizontal coordinate (x') is as follows:

$$X' = \overline{n'k} = \overline{ab} = \overline{ac} + \overline{cb} \quad \text{(formula 1)}$$

$$\overline{cb} = \overline{cf} \cdot \cos\theta = (\overline{cg} - \overline{fg}) \cdot \cos\theta = (\overline{nk} - \overline{fg}) \cdot \cos\theta = (X - \overline{kg} \cdot \tan\theta) \cdot \cos\theta = (X - Y \cdot \tan\theta) \cdot \cos\theta = X \cdot \cos\theta - Y \cdot \sin\theta \quad \text{(formula 2)}$$

$$\overline{ac} = \overline{pm} = \overline{po} - \overline{mo} = r - \overline{co} \cdot \cos\left(\theta + \tan^{-1}\left(\frac{h}{w}\right)\right) = r - r \cdot \cos\left(\theta + \tan^{-1}\left(\frac{h}{w}\right)\right) = r - r \cdot \left[\cos\theta \cdot \cos\left(\tan^{-1}\left(\frac{h}{w}\right)\right) - \sin\theta \cdot \sin\left(\tan^{-1}\left(\frac{h}{w}\right)\right)\right] = r - r \cdot \left[\cos\theta \cdot \left(\frac{w}{2r}\right) - \sin\theta \cdot \left(\frac{h}{2r}\right)\right] = r - r \cdot \left[\left(\frac{w}{2r}\right) \cdot \cos\theta - \left(\frac{h}{2r}\right) \cdot \sin\theta\right] = r - \left(\frac{w}{2}\right) \cdot \cos\theta + \left(\frac{h}{2}\right) \cdot \sin\theta = \frac{\sqrt{w^2 + h^2}}{2} - \left(\frac{w}{2}\right) \cdot \cos\theta + \left(\frac{h}{2}\right) \cdot \sin\theta$$

with (formula 2) substitute into (formula 1)

$$X' = \overline{cb} + \overline{ac} = X \cdot \cos\theta - y \cdot \sin\theta + \frac{\sqrt{w^2 + h^2}}{2} - \left(\frac{w}{2}\right) \cdot \cos\theta + \left(\frac{h}{2}\right) \cdot \sin\theta$$

(4) The first pixel vertical coordinate (y') of the first pixel is calculated as follows:

$$Y' = \overline{kf} + \overline{fb} + \overline{bg'} \quad \text{(formula 3)}$$

$$\overline{fb} = \overline{cf} \cdot \sin\theta = (\overline{cg} - \overline{fg}) \cdot \sin\theta = (\overline{nk} - \overline{fg}) \cdot \sin\theta = (X - \overline{kg} \cdot \tan\theta) \cdot \sin\theta = (X - Y \cdot \tan\theta) \cdot \sin\theta = X \cdot \sin\theta - Y \sin\theta \cdot \tan\theta \quad \text{(formula 4)}$$

$$\overline{kf} = \overline{kg} \cdot \sec\theta = \frac{\overline{kg}}{\cos\theta} = \frac{Y}{\cos\theta} \quad \text{(formula 5)}$$

$$\overline{bg'} = \overline{cd} = \overline{md} - \overline{mc} = r - \overline{co} \cdot \sin\left(\theta + \tan^{-1}\left(\frac{h}{w}\right)\right) = r - r \cdot \sin\left(\theta + \tan^{-1}\left(\frac{h}{w}\right)\right) = r - r \cdot \left[\sin\theta \cdot \cos\left(\tan^{-1}\left(\frac{h}{w}\right)\right) + \cos\theta \cdot \sin\left(\tan^{-1}\left(\frac{h}{w}\right)\right)\right] =$$

-continued $$r - r\cdot\left[\sin\theta\cdot\left(\frac{w}{2r}\right) + \cos\theta\cdot\left(\frac{h}{2r}\right)\right] =$$

$$r - \left(\frac{h}{2}\right)\cdot\cos\theta - \left(\frac{w}{2}\right)\cdot\sin\theta = \frac{\sqrt{w^2+h^2}}{2} - \left(\frac{h}{2}\right)\cdot\cos\theta - \left(\frac{w}{2}\right)\cdot\sin\theta$$

with (formula 5, formula 4) substitute into (formula 3)

$$Y' = \overline{fb} + \overline{kf} + \overline{bg'}$$

$$Y' = X\cdot\sin\theta - Y\cdot\sin\theta\cdot\tan\theta + \frac{Y}{\cos\theta} + \frac{\sqrt{w^2+h^2}}{2} - \left(\frac{h}{2}\right)\cdot\cos\theta - \left(\frac{w}{2}\right)\cdot\sin\theta$$

Figure 10A:
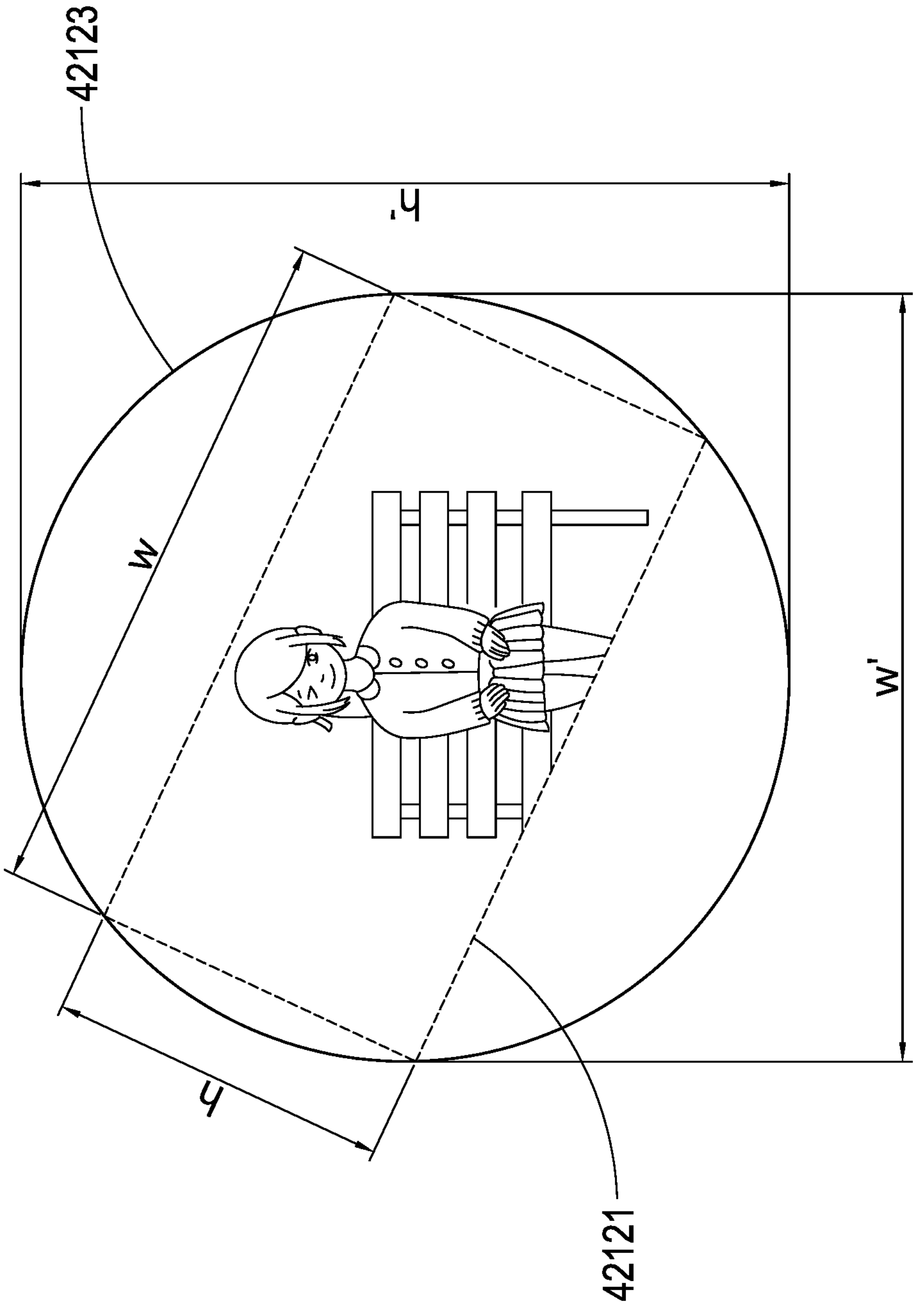
FIG. 10A is a schematic diagram of the implementation of different angles of the center rotation image of the image correction system and the method therefor of the present invention.
Figure 10B:
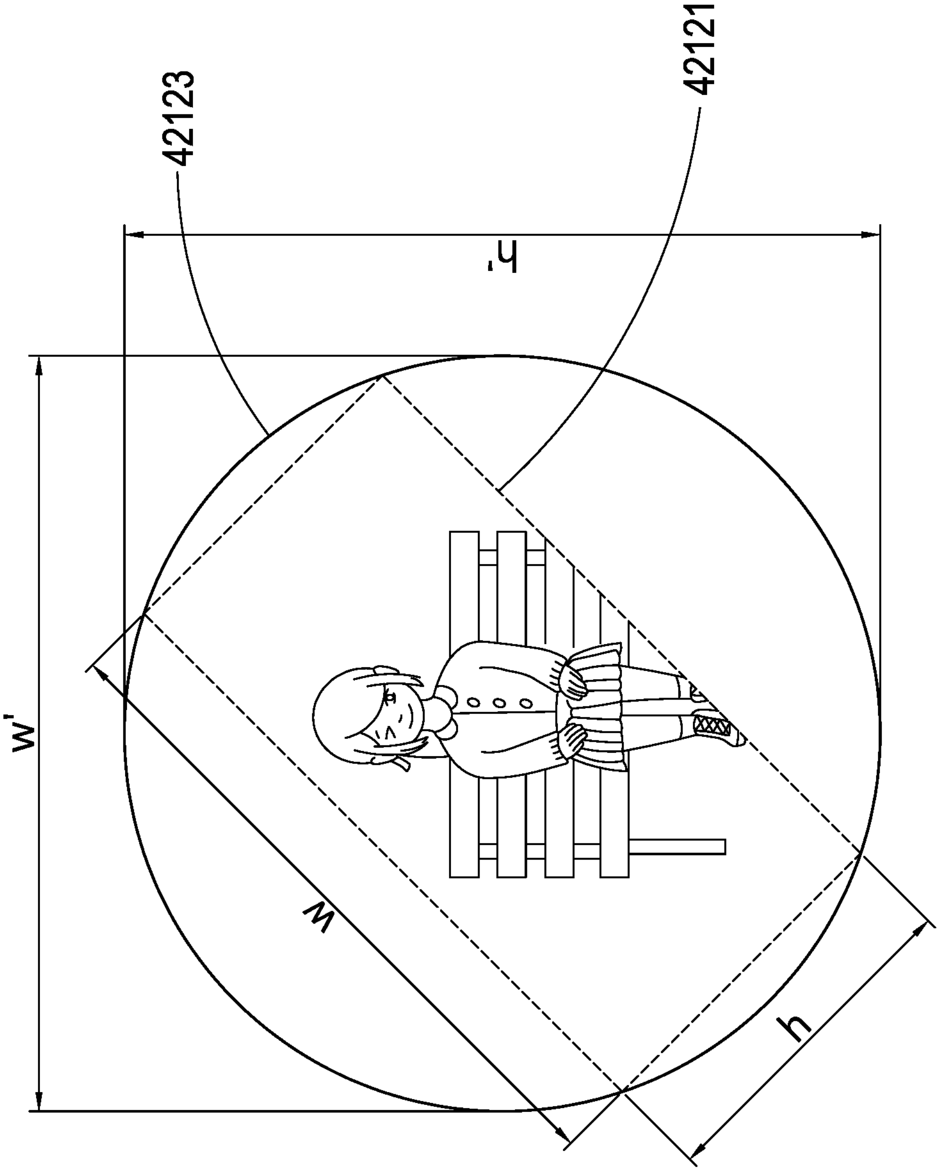
FIG. 10B is a schematic diagram of the implementation of different angles of the center rotation image of the image correction system and the method therefor of the present invention.

The following different implementation styles are presented from different angles:

As shown in FIG. 10A, it represents that the original shooting lens is inclined clockwise (positive 15 degrees), and the frame line of image boundary 42121 represents the image boundary of the original image captured image, and the frame line 42123 represents the circle frame;

As shown in FIG. 10B, it represents that the original shooting lens is tilted at a negative angle (minus 45 degrees) counterclockwise, in which the frame line of image boundary 42121 represents the image boundary of the original image captured image, and the frame line 42123 represents the circle frame.

Figure 11:
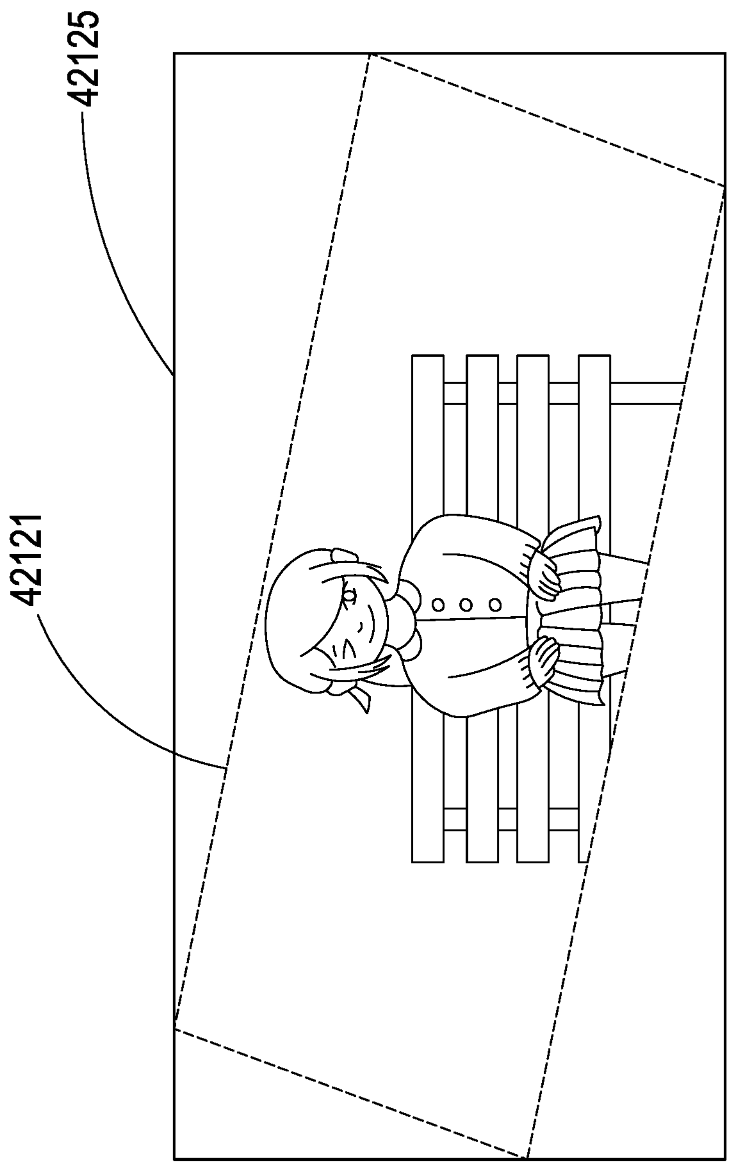
FIG. 11 is a schematic diagram of image distortion after inclination correction of the image correction system and the method therefor of the present invention.

In FIG. 8A, the original width to length ratio (w:h) of the dotted line image is 2:1. If the tilt angle correction is completed, (w', h') will still be rotated with a width to length ratio of 2:1. The output will become as shown in FIG. 11. It can be seen from the figure that the image (frame line 42125 indicates the distortion image range after correction) has been distorted and must be processed.

Figure 12:
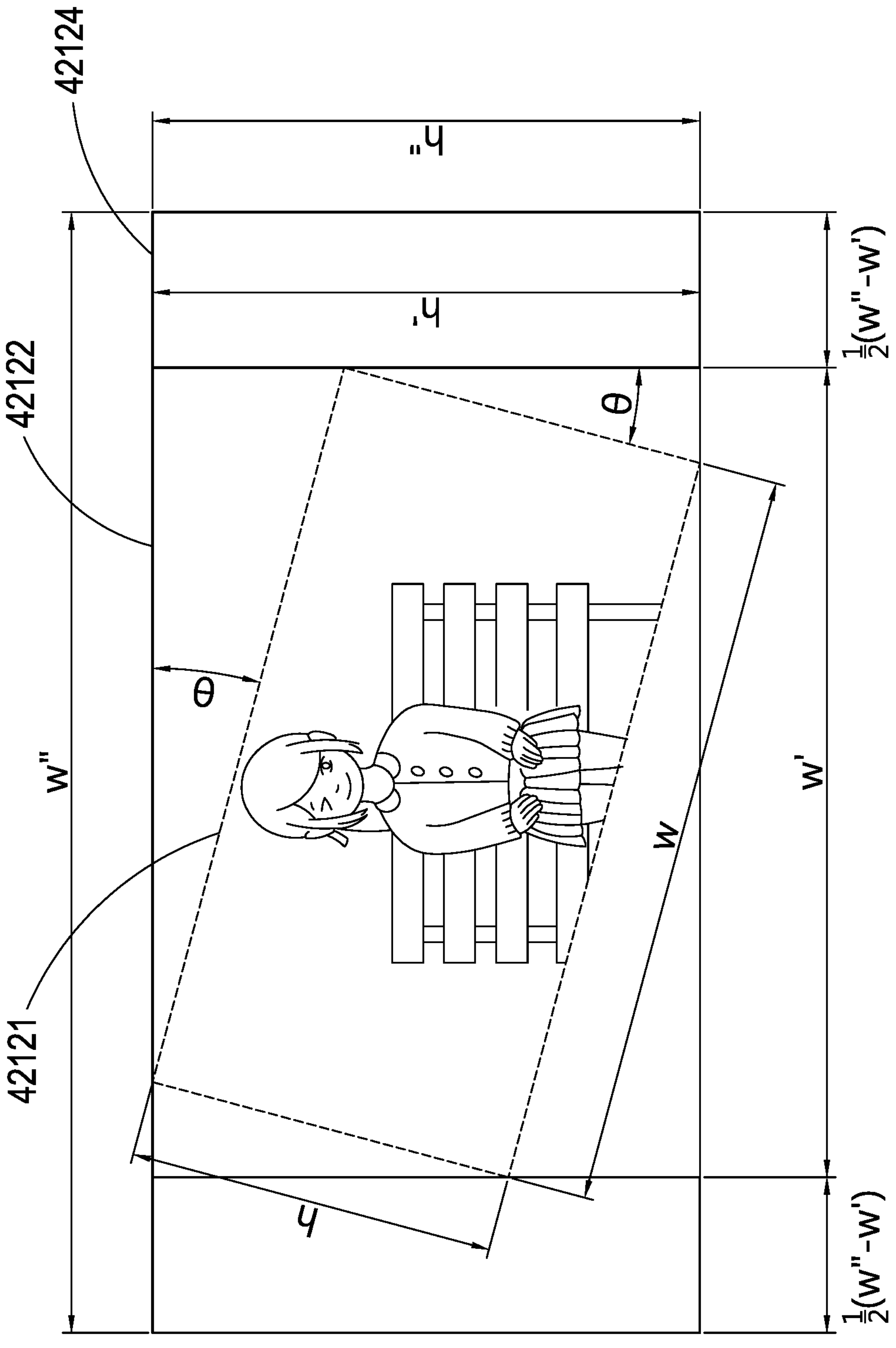
FIG. 12 is a schematic diagram of the aspect ratio correction with the addition of a new coordinate axis of the image correction system and the method therefor of the present invention

As shown in FIG. 12, the surrounding frame of w', h' indicates that the image boundary 42121 of the original image is surrounded by a rectangular frame 42122, and the frame line 42124 is used to indicate the image range after the aspect ratio correction, and the image boundary 42121 of the original image is used. It is centered, and it is explained that w is greater than or equal to h (w is less than h can be deduced by ordinary technicians according to the following formula, so it will not be repeated), and the aspect ratio correction is explained as follows:

(1) To keep the image aspect ratio, formula 6 is as follows:

$$\frac{w''}{h''} = \frac{w}{h}$$

(2) The minimum image with the same width and length ratio is:

$$h''=h'=w\cdot|\sin\theta|+h\cdot\cos\theta$$

(3) Substitute into formula 6 to get:

$$w''=\frac{w}{h}\cdot(w\cdot|\sin\ \theta|+h\cdot\cos\ \theta)$$

(4) Further get:

$$X''=X'+\tfrac{1}{2}(w''-w')$$

as we know $w'=w\cdot\cos\theta+h\cdot|\sin\theta|$ then (5)

$$X''= X'+\frac{1}{2}\cdot\left[\frac{w}{h}\cdot(w\cdot|\sin\ \theta|+h\cdot\cos\ \theta)-w\cdot\cos\ \theta-h\cdot|\sin\ \theta|\right]$$

$$= X' + \frac{1}{2h}\cdot\left(w^2-h^2\right)\cdot|\sin\theta|$$

$$Y''=Y'$$

Figure 13:
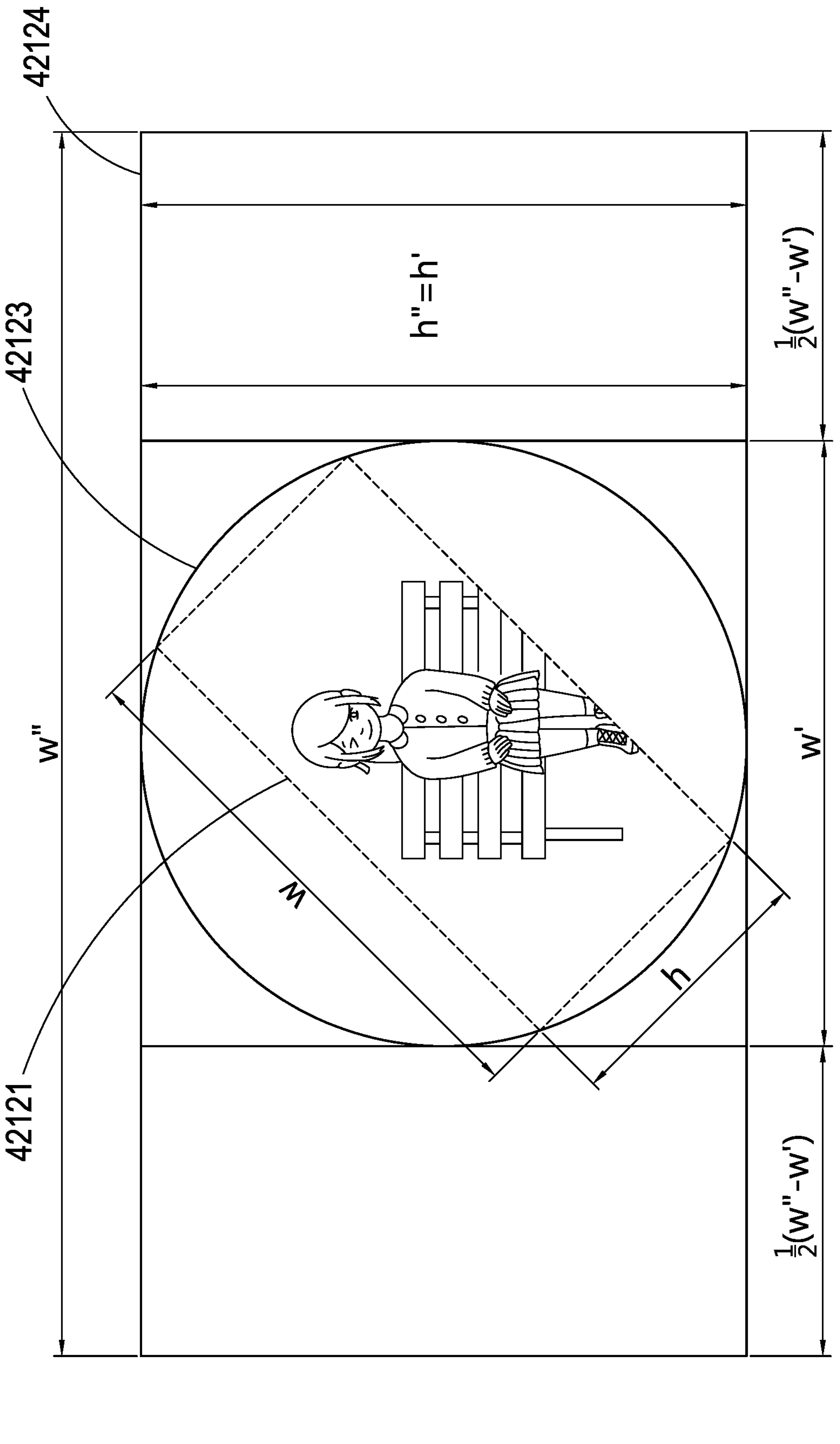
FIG. 13 is a schematic diagram of the aspect ratio correction of the center rotation image of the image correction system and the method therefor of the present invention.

As shown in FIG. 13, the surrounding frame is the circle frame 42123, and the frame line 42124 is used to indicate the image range after correction, and the image boundary 42121 of the original image is centered, and the circle frame is used to indicate the original image. The offset amount in the X' direction, and the aspect ratio correction is described as follows:

(1) To keen the image aspect ratio, formula 7 is as follows:

$$\frac{w''}{h''} = \frac{w}{h}$$

(2) The minimum image with the same width and length ratio is:

$$h''=h'=w'=2r=\sqrt[2]{w^2+h^2}$$

(3) Substitute into formula 7 to get:

$$w''=\frac{w}{h}\cdot\left(\sqrt[2]{w^2+h^2}\right)$$

$$\frac{1}{2}\left(w''-w'\right)=\frac{1}{2}\sqrt[2]{w^2+h^2}\cdot\left(\frac{w}{h}-1\right)$$

(4) then:

$$X'' = X' + \frac{1}{2}\sqrt[2]{w^2+h^2}\cdot\left(\frac{w}{h}-1\right)$$

(5) Y"=Y'

In addition, no matter whether the surrounding frame is a circumscribed rectangular frame or a round frame, where Y"=Y' can keep the aspect ratio of the image, as for the area outside the extended image, a blank bottom or a background can be added. It can be handled and will not be repeated here.

In addition, because the general display has its own "Auto Fit" capability, the projection of the mobile phone to the mobile phone or the projection of the mobile phone to the TV can be automatically extended to the maximum displayable state of the display, so this case uses the original image and the same aspect ratio (h/w) for correction. Therefore, the aspect ratio correction in this case does not need to pay attention to the specifications of any display screen (for example, how many pixels in length and width).

Figure 1A:
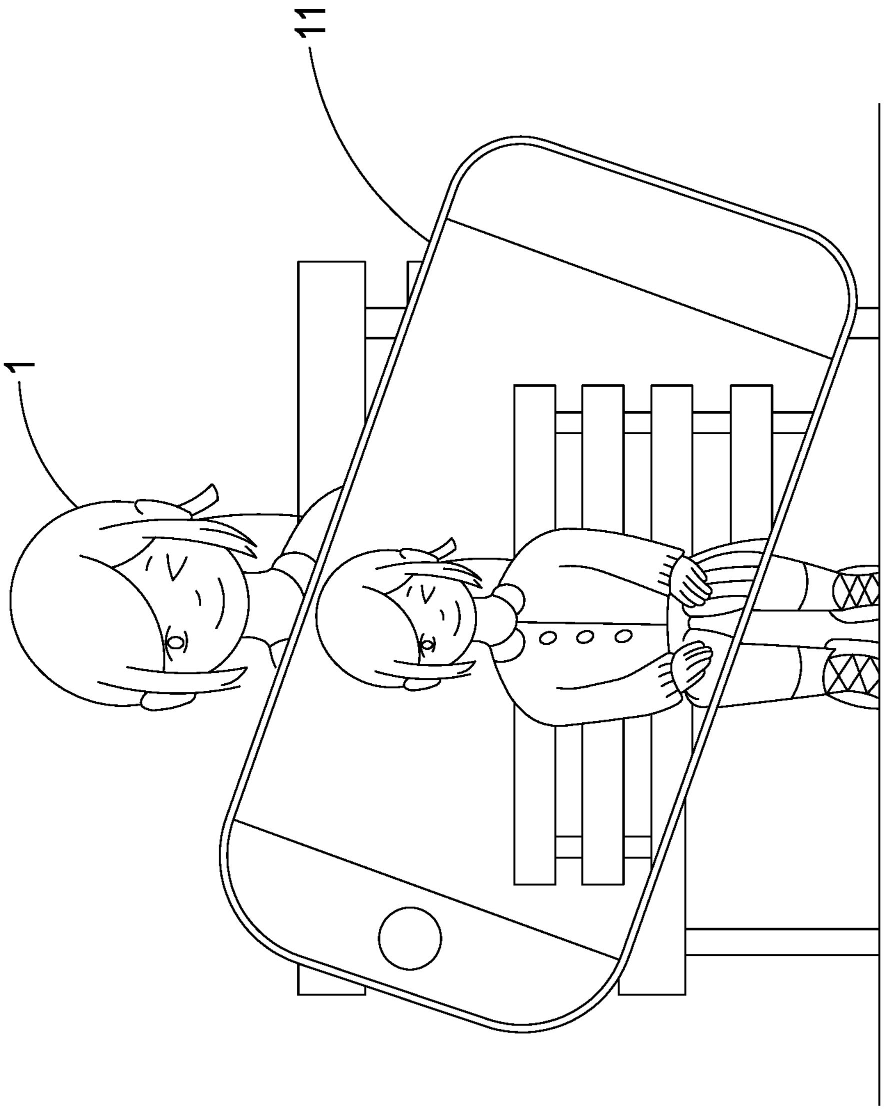
FIG. 1A is a schematic diagram of conventional image capture.
Figure 1B:
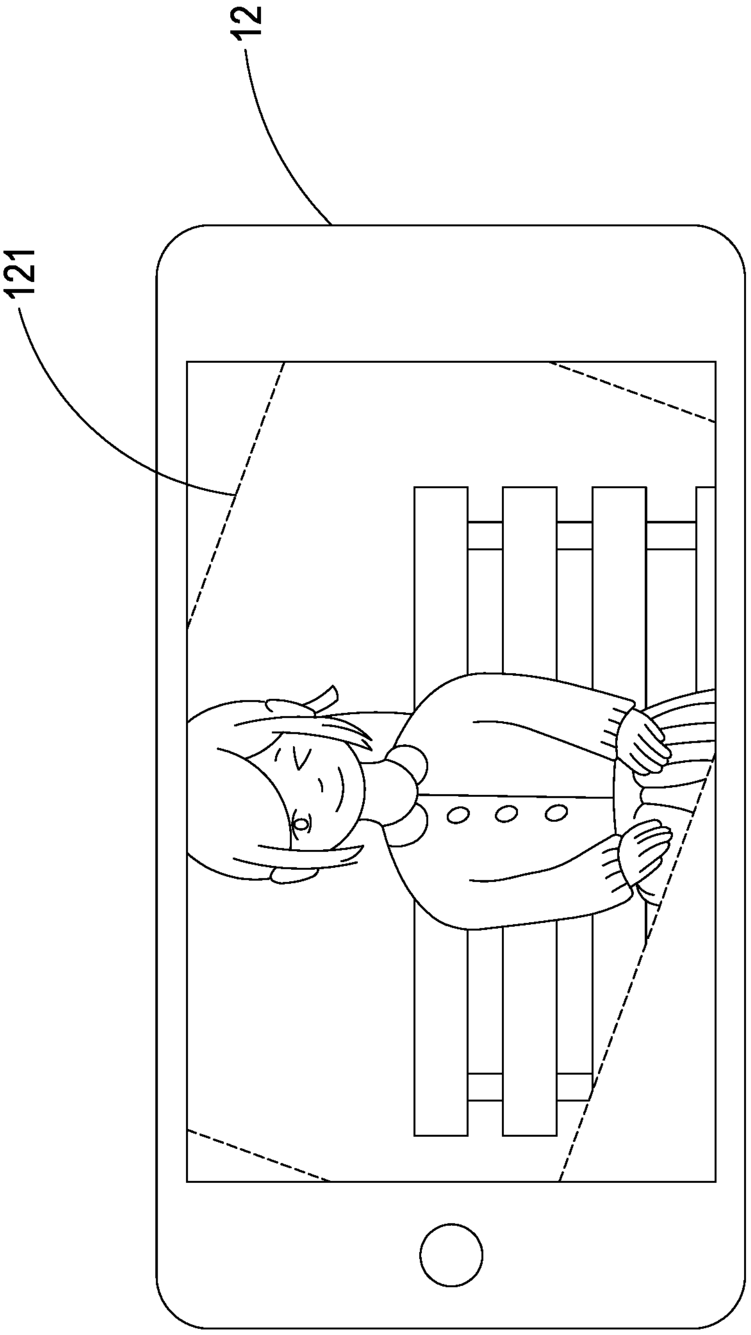
FIG. 1B is a schematic diagram of conventional image capture after correction.
Figure 14A:
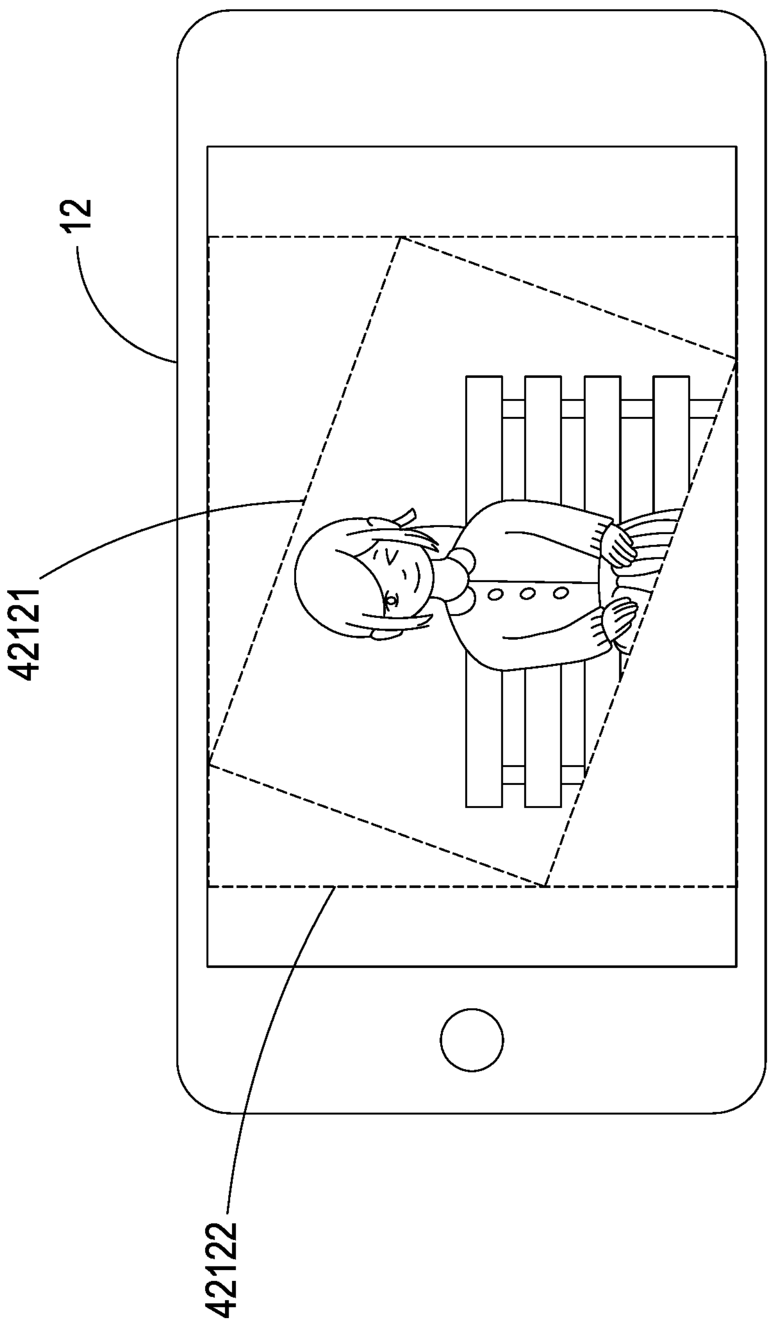
FIG. 14A is a schematic diagram of the correction results of the inclination and aspect ratio of the present case through the truncation distortion of the externally connected new coordinate axis of the image correction system and the method therefor of the present invention.
Figure 14B:
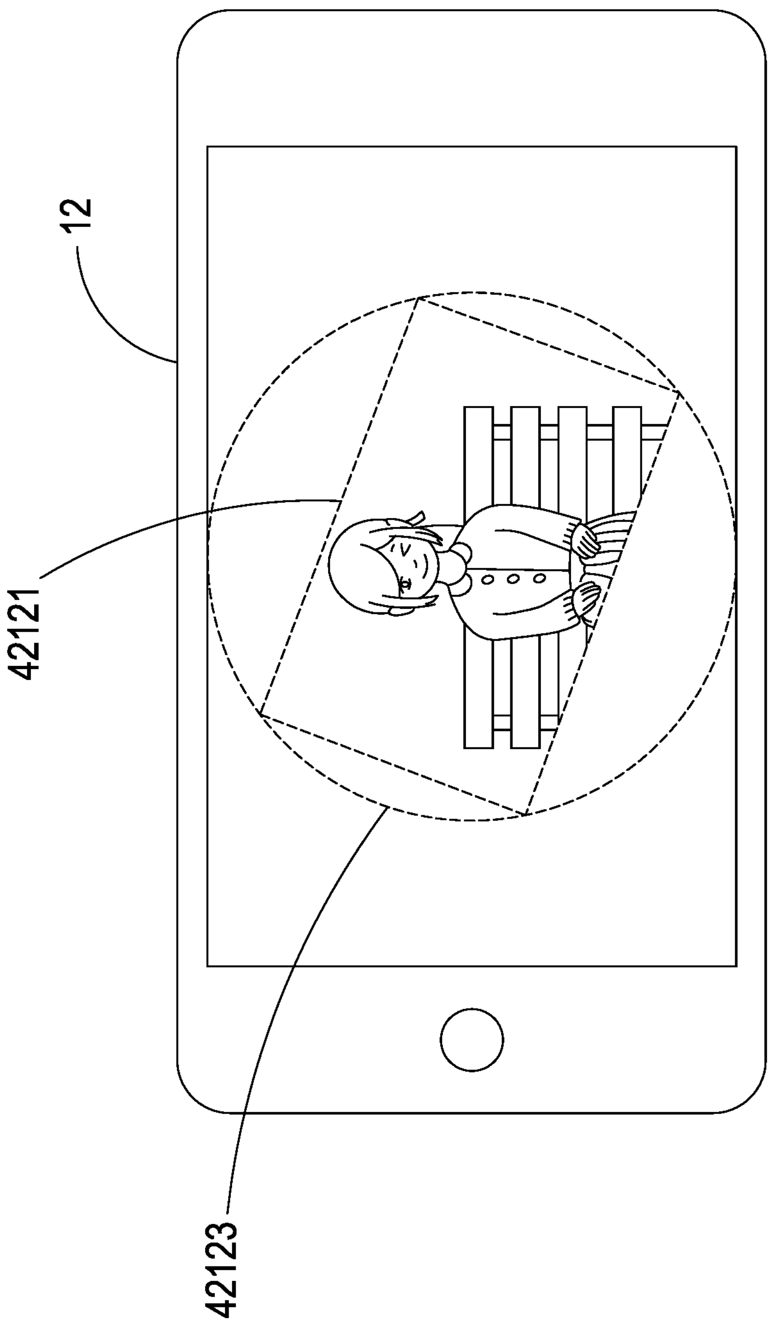
FIG. 14B is a schematic diagram of the correction results of the inclination angle and aspect ratio through the truncation distortion of the centrally rotated image of the image correction system and the method therefor of the present invention.

In addition, after performing correction in FIG. 1A, if the correction is performed by the method of circumscribing a new coordinate axis (with the surrounding frame as the circumscribed rectangular frame), the effect is as shown in FIG. 14A; if the method of rotating the new coordinate axis of the circumscribing circle of the image by the center Perform correction, the effect is shown in FIG. 14B, where frame line 42121 is an image boundary, frame line 42122 is an image circumscribed rectangle, and frame line 42123 is an image circumscribed circle. The effect can obviously improve the problem.

Figure 2A:
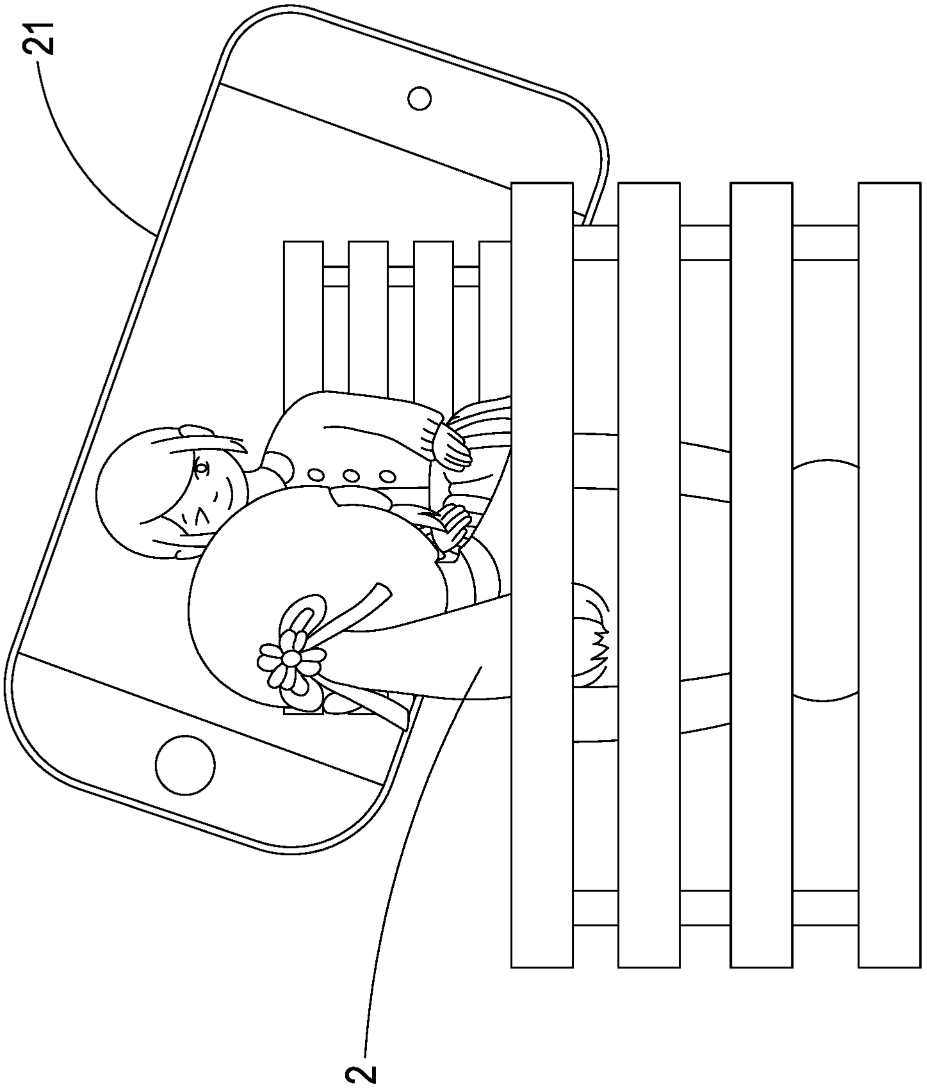
FIG. 2A is a schematic diagram of another conventional image capture.
Figure 2B:
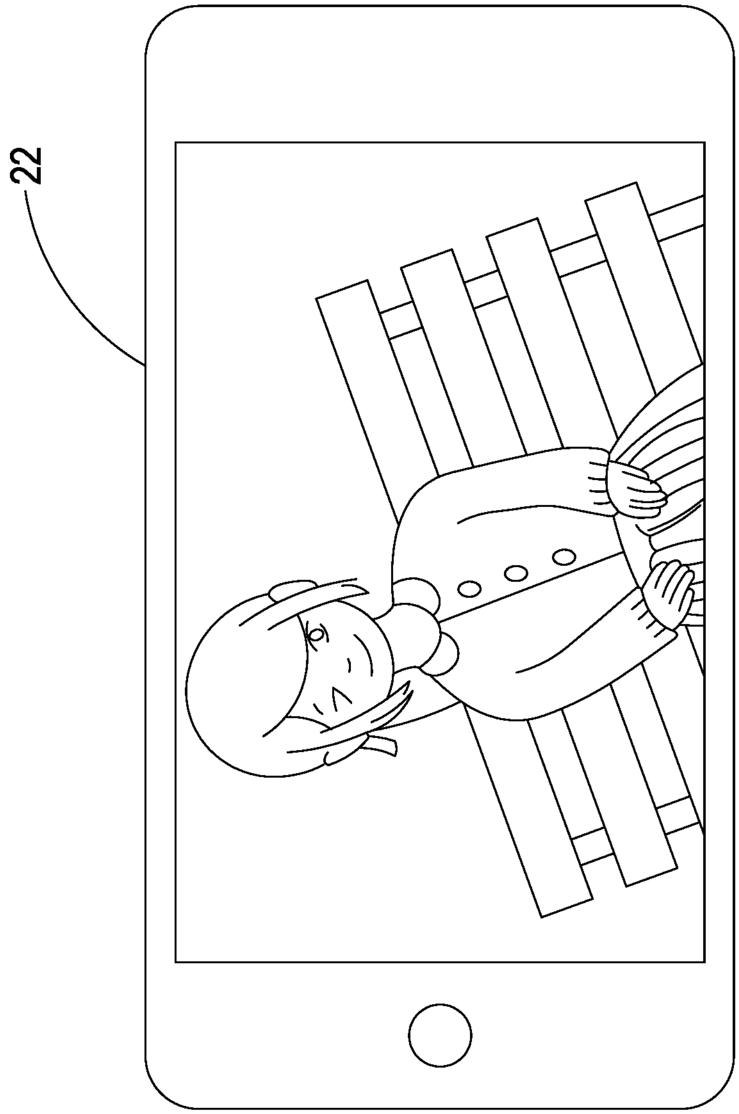
FIG. 2B is a schematic diagram of the receiving end of another conventional image capture after correction.
Figure 3:
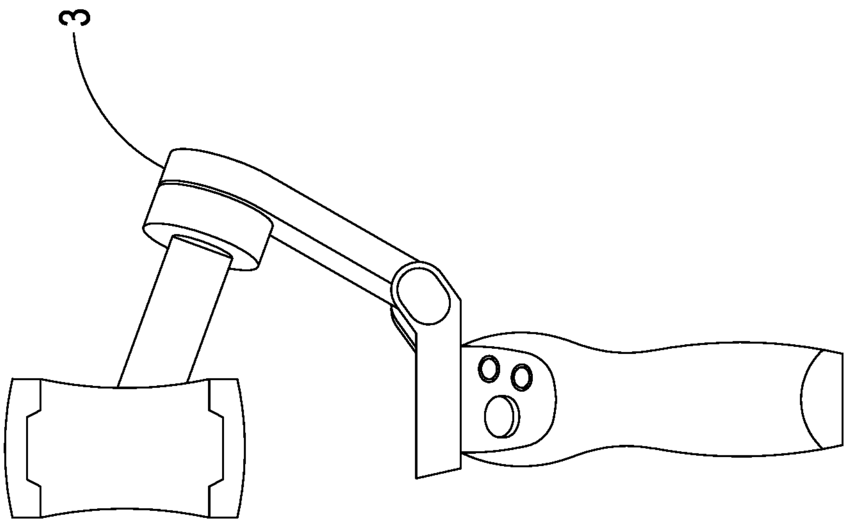
FIG. 3 is a schematic diagram of a conventional three-axis stabilizer.
Figure 15A:
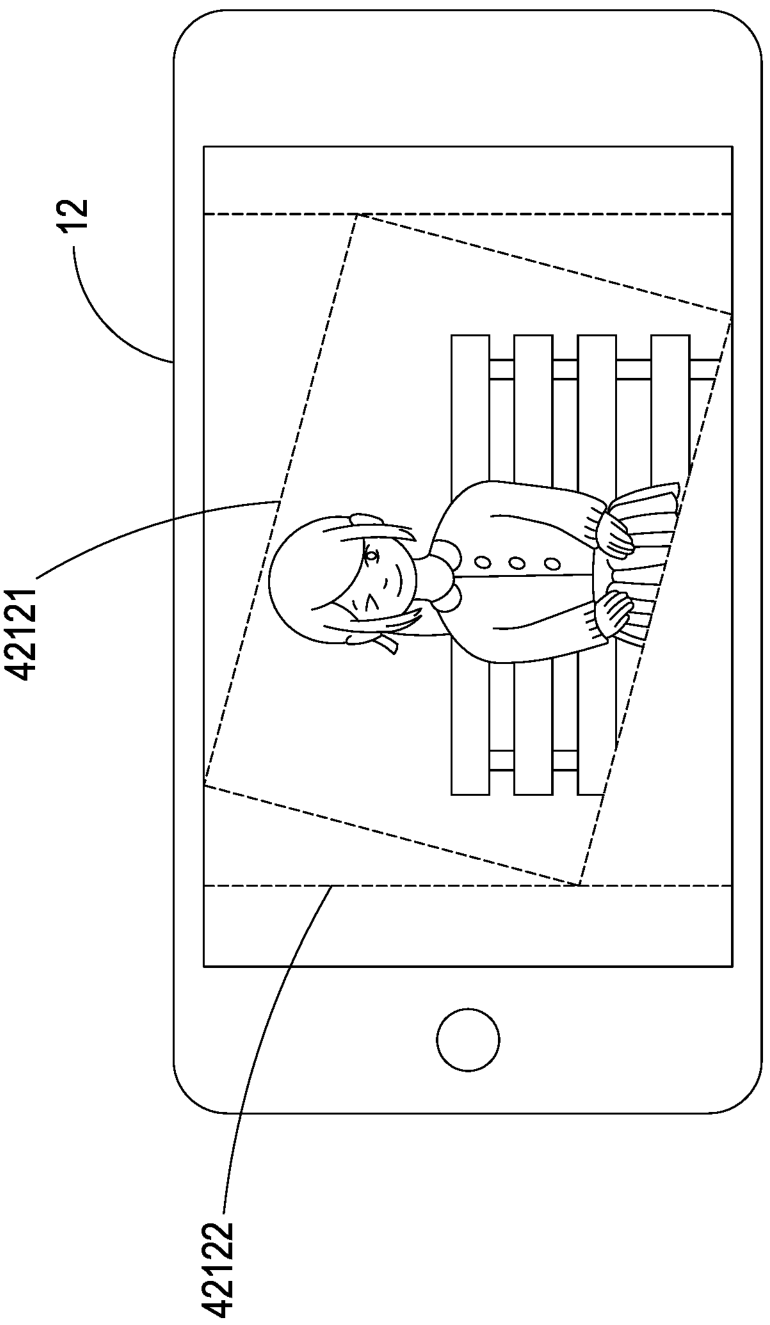
FIG. 15A is a schematic diagram of the correction results of the inclination angle and aspect ratio of the present case by confounding the viewer with the externally connected new coordinate axis of the image correction system and the method therefor of the present invention.
Figure 15B:
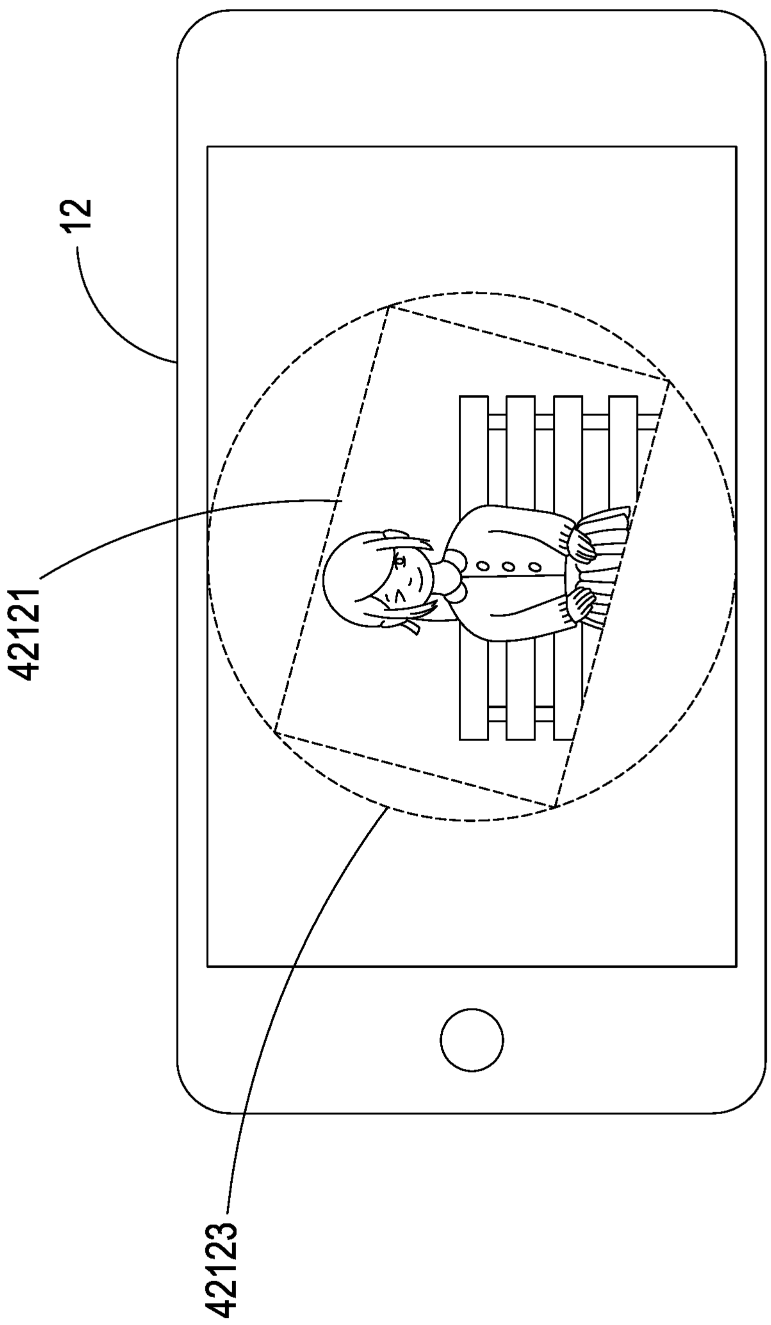
FIG. 15B is a schematic diagram of the result of the correction of the inclination angle and the aspect ratio of the present case, which is confusing to the viewer through the center rotation of the image correction system and the method therefor of the present invention.

In addition, after performing correction for FIG. 2B, if the correction is performed by the method of circumscribed new coordinates (with the surrounding frame as the circumscribed rectangle), the effect is as shown in FIG. 15A; if the correction is performed by the circumscribed circle method of rotating the image at the center, the effect is shown in FIG. 15B, wherein frame line 42121 is an image boundary, frame line 42122 is an image circumscribed rectangle, and frame line 42123 is an image circumscribed circle, which can obviously improve the problem.

Figure 16:
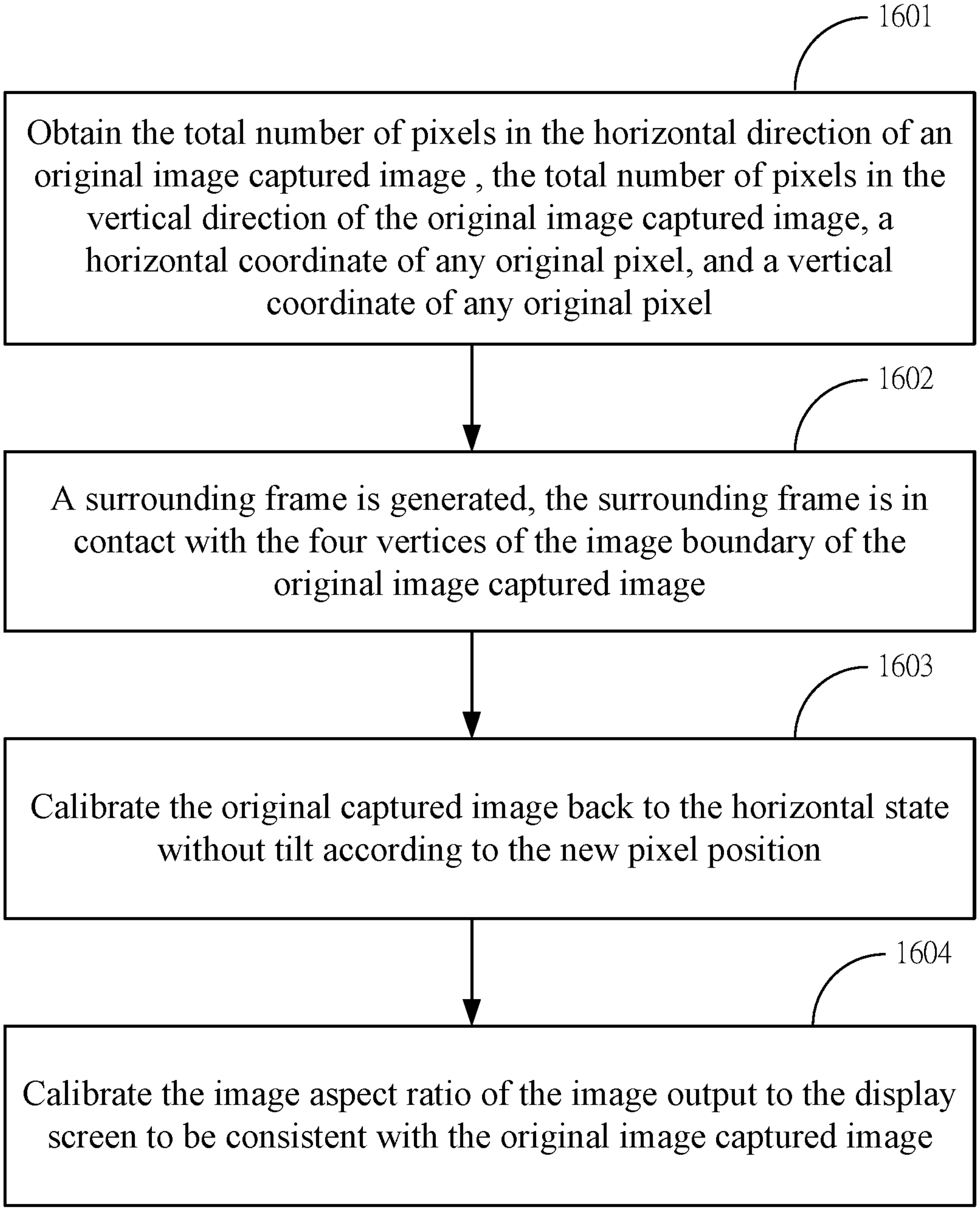
FIG. 16 is a schematic diagram of the image correction process flow of the image correction system and the method therefor of the present invention.

As shown in FIG. 16, the steps of the image correction method in this case are:

(1) An image regression application unit obtains an original image captured image and a tilt angle information (θ) from one or more image information carriers, and scans the image signal of each frame of the original image captured image to obtain the total number of pixels in the horizontal direction of the original image captured image, a total number of pixels in the vertical direction of the original image captured image, a horizontal coordinate of any original pixel, and a vertical coordinate of any original pixel 1601;

(2) The image regression application unit outputs a total number of pixels in the first horizontal direction (w') and a total number of pixels in the first vertical direction (h') around the original image captured image according to the total number of pixels in the original horizontal direction (w) and the total number of pixels in the original vertical direction (h) and generate a surrounding frame, the surrounding frame is in contact with the four vertices of the image boundary of the original image captured image 1602;

(3) The image regression application unit outputs a first pixel horizontal coordinate (x') and a first pixel vertical coordinate (y') in a not tilted state according to the tilt angle information (θ), so that the original image captured image can be based on a plurality of the first pixel horizontal coordinate (x') and the plurality of first pixel vertical coordinate (y') generate a new pixel position, so as to correct the original image captured image back to a horizontal state without tilt according to the new pixel position 1603; and (4) The image regression application unit obtains a total number of pixels in the second horizontal direction (w") and a total number of pixels in the second vertical direction (h") according to an equal aspect ratio (h/w) of the original image used to output the image, and output a second pixel horizontal coordinate (x") according to the total number of pixels in the second horizontal direction (w"), the total number of pixels in the first horizontal direction (w') and the first pixel horizontal coordinate (x'), and then output a second pixel vertical coordinate (y") according to the first pixel vertical coordinate (y'), so that the image output on the display screen for correction can be consistent with the image aspect ratio of the original image captured image 1604.

Compared with other conventional techniques, the image correction system and method provided by the present invention have the following advantages:

1. The present invention can continuously calibrate and return to the horizontal image according to the continuously changing arbitrary inclination of the image, and can return to the image record which is non-truncated and has the same aspect ratio as the original image.
2. The present invention provides an image regression application unit, the image regression application unit includes at least a tilt correction element and an aspect correction element, wherein the image regression application unit is used for obtaining an original image captured image and an original image captured image from one or more image information carriers. Tilt angle information (θ), and then output a new pixel position according to the tilt angle information (θ), and then perform correction image aspect ratio to obtain the minimum complete image when the camera is tilted. Horizontal tilt angle regression and maintain aspect ratio The result is recorded as an image that can be returned to be horizontal, non-truncated, and has the same aspect ratio as the original image.
3. The present invention can perform continuous correction and return to the horizontal image in the form of electronic circuits or software, so it is not necessary to use a three-axis stabilizer. In addition to saving costs, the equipment is also possible heavy and carry a lot of components and use them in the same way when shooting.

The above-detailed description is a specific description of a feasible embodiment of the present invention, but this embodiment is not intended to limit the patent scope of the present invention. Any equivalent implementation or modification that does not depart from the technical spirit of the present invention shall be included within the scope of the patent in this case.

What is claimed is:

1. An image correction system for an electronic device, wherein the electronic device has at least one processor and at least one computer-readable recording medium, and the electronic device is capable of outputting an image to a display screen, and the computer-readable recording medium stores one or more information carriers, the image correction system comprising:

at least one image regression application unit stored in the computer-readable recording medium, including:

a tilt correction element, which is able to obtain an original image captured image and a tilt angle information (θ) from the one or more image information carriers, and scan each frame of image signals of the original image captured image to obtain a total number of pixels in an original horizontal direction (w), a total number of pixels in an original vertical direction (h), a horizontal coordinate of any original pixel (x), and a vertical coordinate of any original pixel (y), and then output a total number of pixels in a first horizontal direction (w') and a total number of pixels in a first vertical direction (h') around the original image captured image based on the total number of pixels in the original horizontal direction (w) and the total number of pixels in the original vertical direction (h) to generate a surrounding frame, wherein the surrounding frame is in contact with four vertices of an image boundary of the original image captured image, and outputs a first pixel horizontal coordinate (x') and a first pixel vertical coordinate (y') in a not tilted state based on the title angle information (θ), so that the original image captured image can generate a new pixel position based on the first pixel horizontal coordinate (x') and the first pixel vertical coordinate (y'), so as to correct the original image captured image back to a horizontal state without tilt based on the new pixel position; and an aspect correction element, which is connected to the tilt correction element, can obtain a total number of pixels in a second horizontal direction (w") and a total number of pixels in a second vertical direction (h") based on an original image equal aspect ratio (h/w), and output a second pixel horizontal coordinate (x") based on the total number of pixels in the second horizontal direction (w"), the total number of pixels in the first horizontal direction (w') and the first pixel horizontal coordinate (x'), and output a second pixel vertical coordinate (y") based on the first pixel vertical coordinate (y'), so that an image output on the display screen for correction can be consistent with an image aspect ratio of the original image captured image.

2. The image correction system of claim 1, wherein the surrounding frame is a circumscribed rectangular frame, wherein the circumscribed rectangular frame is formed along four vertices of the image boundary of the original image captured image.

3. The image correction system of claim 1, wherein the surrounding frame is a circular frame, wherein the circular frame is formed with the center of the original image captured image as the center of the circle, and the four vertices of the image boundary of the original image captured image are in contact on the round frame.

4. The image correction system of claim 1, wherein the electronic device can be provided with or connected to a camera lens electrically connected to the processor and a gravity angle sensor that is electrically connected to the processor, and can generate the original image captured image through the camera lens, detect the tilt angle information (θ) through the gravity angle sensor, and read and write the computer-readable recording medium.

5. The image correction system of claim 1, wherein the image information carrier is an original image captured image containing the tilt angle information (θ) for each frame of image.

6. The image correction system of claim 5, wherein the original image captured image containing the tilt angle information (θ) in each frame of the image is in an exchangeable image file format.

7. The image correction system of claim 1, wherein the image regression application unit has a control switching module for controlling the image displayed on the display screen to be the original image captured image after correction or the original image captured image without correction image.

8. The image correction system of claim 1, wherein the display screen can be installed on the electronic device or connected to the electronic device through a connector or wireless connection.

9. An image correction method comprising:

(a) an image regression application unit retrieving an original image captured image and a tilt angle information (θ) from one or more image information carriers, and scaning each frame of image signals of the original image captured image to obtain a total number of pixels in an original horizontal direction (w), a total number of pixels in an original vertical direction (h), a horizontal coordinate of any original pixel (x), and a vertical coordinate of any original pixel (y);

(b) the image regression application unit outputting a total number of pixels in a first horizontal direction (w') and a total number of pixels in a first vertical direction (h') around the original image captured image based on the total number of pixels in the original horizontal direction (w) and the total number of pixels in the original vertical direction (h) and generating a surrounding frame, wherein the surrounding frame is in contact with four vertices of an image boundary of the original image captured image;

(c) the image regression application unit outputting a first pixel horizontal coordinate (x') and a first pixel vertical coordinate (y') in a not tilted state based on the tilt angle information (θ), so that the original image captured image can generate a new pixel position based on the first pixel horizontal coordinate (x') and the first pixel vertical coordinate (y') to generate a new pixel position, so as to correct the original image captured image back to a horizontal state without tilt based on the new pixel position; and (d) the image regression application unit obtaining a total number of pixels in a second horizontal direction (w") and a total number of pixels in a second vertical direction (h") based on an original image equal aspect ratio (h/w), and outputting a second pixel horizontal coordinate (x") based on the total number of pixels in the second horizontal direction (w"), the total number of pixels in the first horizontal direction (w') and the first pixel horizontal coordinate (x'), and then outputting a second pixel vertical coordinate (y") based on the first pixel vertical coordinate (y') for correcting an image output to the display screen to be consistent with an image aspect ratio of the original image captured image.

* * * * *